(12) United States Patent
Barbitta et al.

(10) Patent No.: US 11,171,898 B2
(45) Date of Patent: Nov. 9, 2021

(54) EXTENSIBLE FRAMEWORK FOR REPORTING AUTOMATED WORKFLOW ANALYTICS

(71) Applicant: Amazon Technologies, Inc., Seattle, WA (US)

(72) Inventors: Zachary Jake Barbitta, Seattle, WA (US); Aprajita Arora, Seattle, WA (US); Preetam Dasgupta, Seattle, WA (US); Prateek Mehrotra, Bothell, WA (US); Austin M. Nevins, Seattle, WA (US); Mohit Kumar Palriwal, Seattle, WA (US); Michael Sadahiro, Seattle, WA (US); Jonathan Edward Suchland, Seattle, WA (US); Kuangyou Yao, Seattle, WA (US); Justin Lowry, Seattle, WA (US); Attila Zoltan Kovacs, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 16/714,609

(22) Filed: Dec. 13, 2019

(65) Prior Publication Data
US 2021/0136027 A1     May 6, 2021

Related U.S. Application Data

(60) Provisional application No. 62/928,283, filed on Oct. 30, 2019.

(51) Int. Cl.
*H04L 12/58* (2006.01)
*H04L 29/08* (2006.01)
(Continued)

(52) U.S. Cl.
CPC ..... *H04L 51/046* (2013.01); *G06Q 10/06316* (2013.01); *G06Q 30/0204* (2013.01);
(Continued)

(58) Field of Classification Search
None
See application file for complete search history.

(56) References Cited

U.S. PATENT DOCUMENTS 5,978,836 A * 11/1999 Ouchi ............... G06Q 10/10
709/203
7,581,011 B2 * 8/2009 Teng ................. G06F 21/41
709/229

(Continued)

FOREIGN PATENT DOCUMENTS

WO    WO2016191749 A1    12/2016

OTHER PUBLICATIONS

PCT Search Report & Written Opinion for Application No. PCT/US2020/058300, dated Jan. 21, 2021, 13 pgs.

(Continued)

*Primary Examiner* — Backhean Tiv
(74) *Attorney, Agent, or Firm* — Lee & Hayes, P.C.

(57) ABSTRACT

A workflow manager can be configured to present a graphical interface to an entity and display a current status of a user population within an active workflow. The workflow manager can identify and monitor individual user actions associated with user paths of the active workflow. The workflow manager can generate user path and workflow analytics that identify the progress of individual users and summarize the overall progress of the user population within the active workflow. The workflow analytics can be generated from event notifications that are emitted by the communications and filters of the active workflow. The graphical interface can be actively updated, in response to the emission of the
(Continued)

event notifications, to present the workflow analytics and user population progress to the entity.

20 Claims, 10 Drawing Sheets

(51) Int. Cl.
  *G06Q 30/02* (2012.01)
  *G06Q 10/06* (2012.01)
  *G06F 3/0482* (2013.01)
  *G06F 3/0486* (2013.01)
(52) U.S. Cl.
  CPC ......... *G06Q 30/0239* (2013.01); *H04L 51/14* (2013.01); *H04L 51/18* (2013.01); *H04L 51/22* (2013.01); *H04L 51/36* (2013.01); *H04L 67/22* (2013.01); *H04L 67/306* (2013.01); *G06F 3/0482* (2013.01); *G06F 3/0486* (2013.01)

(56) References Cited

U.S. PATENT DOCUMENTS

| | | | | |
|---|---|---|---|---|
| 9,910,625 | B2* | 3/2018 | Kessels | G06F 3/1275 |
| 2002/0138543 | A1* | 9/2002 | Teng | G06F 21/6218 |
| | | | | 718/102 |
| 2002/0138577 | A1* | 9/2002 | Teng | G06Q 10/10 |
| | | | | 709/205 |
| 2002/0169835 | A1* | 11/2002 | Paul, Jr. | H04L 67/30 |
| | | | | 709/206 |
| 2003/0023675 | A1* | 1/2003 | Ouchi | G06Q 10/10 |
| | | | | 709/203 |
| 2004/0068424 | A1* | 4/2004 | Lee | G06Q 10/10 |
| | | | | 705/7.15 |
| 2004/0088208 | A1 | 5/2004 | Runge et al. | |
| 2007/0088585 | A1* | 4/2007 | Maguire | G06Q 10/103 |
| | | | | 705/301 |
| 2007/0156878 | A1* | 7/2007 | Martin | G06Q 10/10 |
| | | | | 709/223 |
| 2007/0157088 | A1* | 7/2007 | Lewis-Bowen | G06F 3/0482 |
| | | | | 715/700 |
| 2009/0006997 | A1* | 1/2009 | Jiang | G06Q 10/00 |
| | | | | 715/771 |
| 2009/0204897 | A1* | 8/2009 | Sogge | G06Q 10/06 |
| | | | | 715/700 |
| 2011/0307818 | A1* | 12/2011 | Eby | G06Q 10/103 |
| | | | | 715/769 |
| 2013/0145300 | A1* | 6/2013 | Mackay | G06F 3/0481 |
| | | | | 715/772 |
| 2015/0308846 | A1* | 10/2015 | Ding | G06F 16/444 |
| | | | | 701/424 |
| 2015/0350436 | A1 | 12/2015 | Vymenets et al. | |
| 2016/0119477 | A1 | 4/2016 | Sharpe et al. | |
| 2017/0147296 | A1* | 5/2017 | Kumar | G06Q 10/06 |
| 2017/0316363 | A1* | 11/2017 | Siciliano | G06Q 10/10 |
| 2018/0225795 | A1 | 8/2018 | Napoli | |
| 2021/0049168 | A1* | 2/2021 | Scheideler | G06F 9/542 |
| 2021/0133656 | A1 | 5/2021 | Barbitta et al. | |
| 2021/0136012 | A1 | 5/2021 | Barbitta et al. | |
| 2021/0136027 | A1* | 5/2021 | Barbitta | H04L 51/22 |

OTHER PUBLICATIONS

Office Action for U.S. Appl. No. 16/714,551, dated Apr. 28, 2021, Barbitta, "Extensible Framework for Constructing Autonomous Workflows" 23 pages.

* cited by examiner

EXTENSIBLE FRAMEWORK FOR REPORTING AUTOMATED WORKFLOW ANALYTICS

CROSS-REFERENCE TO RELATED APPLICATION

This application claims priority to and is a non-provisional application of U.S. Provisional Patent Application No. 62/928,283, filed on Oct. 30, 2019, the entire contents of which are incorporated herein by reference.

BACKGROUND

With the increasing number of avenues that can be used by entities (e.g., companies, organizations, etc.) to communicate with users, entities are seeking to develop methods for distributing information obtained by a user path to other user paths within a workflow and to other workflows managed by a workflow manager. Currently, individual workflows require significant development time, cross-team collaboration, and resources (e.g., costs, computing resources, etc.) to effectively inform users of upcoming events, promotional offers, new products, new features, new services, and potential user interests generated by an entity. Additionally, a workflow is comprised of one or more user paths requires custom development for each user path to successfully perform a series of desired actions for each group of users identified by the development teams. As the engagement workflow expands and new user paths are developed, development costs continue to increase and may cause opportunities to be overlooked due to excessive development costs. Dismissed and overlooked opportunities may result in poor user experience, a lack of user access to high value actions, and other costs associated with the forgone opportunities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
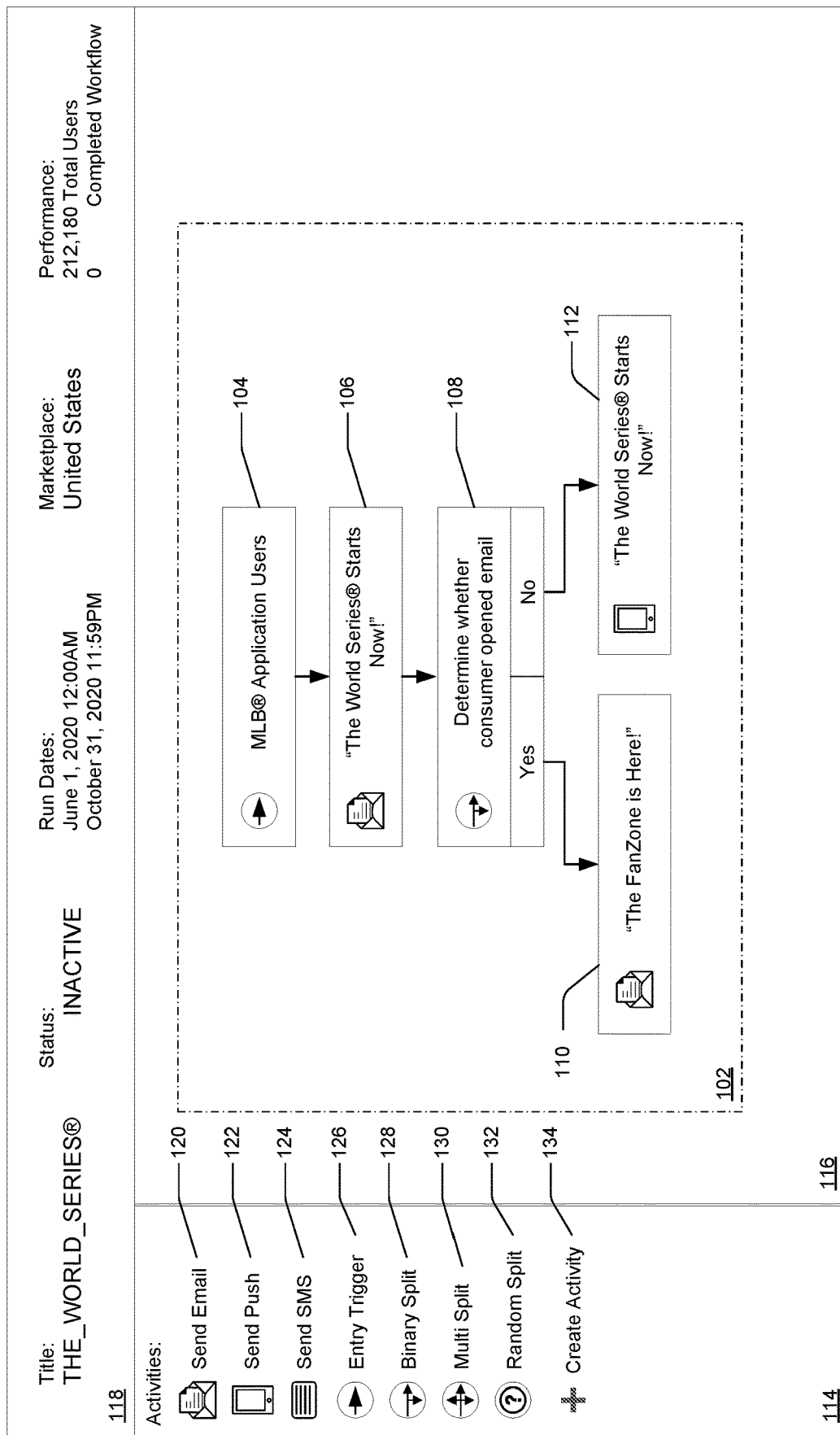
FIG. 1 illustrates an example graphical interface for constructing workflows that are implemented by a workflow manager and comprised of one or more configured activities selected from predefined activities or created by an entity.

Described herein are systems and/or methods related to creating workflows via a graphical interface that can be autonomously implemented by a workflow manager. In particular, graphical interfaces can allow the entity to create, generate, and review configured workflow activities that include multiple engagement workflows that are managed by the workflow manager. As noted above, each workflow can potentially include multiple steps and branch into multiple user paths that are associated with a group of users (e.g., consumers) otherwise known as a user segment. In particular, the user paths of a workflow can include a series of activities that cause an increase in the number of users that complete a task (e.g., participate in an event, complete purchases, re-engage with the entity, submit information, or complete other desired actions) and/or reach an endpoint for a user path. In some embodiments, the graphical interface can present a workspace that allows the entity to configure one or more activities, such as conditions and communications, to form the user paths. In some additional embodiments, a system can automatically generate one or more workflows from previously configured activities associated with the workflow manager. Similarly, the system can automatically select and configure the conditions, paths, and communications to form new user paths based on one or more user attributes that are determined and monitored by the system. Once generated, the graphical interface can present created workflows to the entity, via a device associated with the entity (also referred to herein as "entity device"), for further editing and/or monitoring of user engagement within any ongoing workflows.

Generally, activities are either conditions, communications, or a combination of a condition and a communication. Communications can include messages, such as emails, text messages (SMS), voice messages, push notifications received via a mobile application, or other messages. Additionally, communications can be configured by the workflow manager, based on a template provided by the entity and one or more user attributes associated with fields of the template (e.g., a name associated with an account inserted into a name field in the template). Further, communications can be configured by the entity inputting a message into a "send" field of the communication and indicating a destination for the messages (e.g., selecting a user attribute that indicates individual user email addresses that have been shared by the users). Conditions are determinations made by the workflow manager that can be configured by the entity. For example, the entity can select a user attribute (e.g., user prefers to receive emails) that, if associated with an individual user, causes the user to follow a defined user path (e.g., send user an email). Additionally, a condition can be configured to lead to one or more user paths. For example, a trigger (or entry) condition can include a single constraint that, once satisfied, causes the user to proceed according to a user path defined in the workflow. Additionally, a split condition (i.e., a binary split, a multivariate split, etc.) can include a first constraint and a second constraint. If the user satisfies the first constraint, the workflow manager can cause the user to proceed according to a first user path. Similarly, if the user satisfies the second constraint, the workflow manager causes the user to proceed according to a second user path. In some embodiments, conditions can be configured evaluations that determine whether a particular occurrence or user attribute is associated with individual users. For example, the condition can be configured to determine whether a user has an active account. When a user associated with a user path of a workflow that includes the condition, the workflow manager can determine whether a user attribute indicates that the user does have an active account. As a result, the user can be assigned to a first user path that requires that users have the active account. Alternatively, if the user does not have an active account, the condition can assign the user to a second user path. In some additional embodiments, communications can be configured to present content (e.g. messages, notifications, promotion offers, etc.) to users. For example, users assigned to the first user path can receive a promotional offer that is only available to users with an active account. Alternatively, users assigned to the second user path can receive a notification of various benefits associated with having such an account.

Accordingly, a workflow manager can operate one or more workflows each comprised of one or more user paths. Additionally, conditions can assign users to individual user paths of the one or more user paths. The user paths can be constructed from communications and/or other conditions. For example, the workflow manager can operate a first workflow for increasing the number of active accounts while maintaining the number of currently active accounts. Such a workflow can include user paths for re-engaging users that have canceled their account, incentivizing users that currently have an account, and providing users without an account information regarding benefits associated with the account. Additionally, the workflow manager can manage a second workflow for generating interest in an upcoming event, comprised of user paths for promoting the event to consumer group of users regardless of account status. Each user path can be associated with an action that is the desired endpoint for the communications and conditions. For example, the action can be a user creating an account, purchasing a promoted item, or participating in the event.

In some further embodiments, user attributes are stored information regarding the user that are relevant to the workflows managed by the workflow manager. User attributes can include general information regarding the user and specific information regarding actions taken by the user during the workflow or the user path. For instance, user attributes can indicate whether a user has an account, whether the account is active, a history (e.g., purchase) associated with the account, indications of when the user has completed various actions (e.g., placing an order), a preferred communication channel, a list of desired items, and other relevant information. Additionally, user attributes can indicate whether a communication was received by the user, whether the user opened/interacted with the communication, or whether the communication was ignored or dismissed. In at least one embodiment, user paths are a series of conditions and communications that are associated with a group of users. For instance, a user path prior to an event may include a condition that identifies that the user has an active account that makes the user eligible for the event and a series of communications related to the event (e.g., a promotional offer associated with the event, details about the event, and one or more items concerning the event that is specifically correlated with the user such as specific items included in the event that the user has indicated an interest in) via the preferred communication channel. Additionally, a second condition can be configured to determine which communications were received and opened by the user and direct the user to an additional user path based on that determination. Further, the group of users can be referred to as a user segment, wherein the user segment can be defined by the user attributes that were required to be assigned to a specific user path. It should be noted that the above examples are not intended to be limiting, but to provide specific instances providing context for the above terms.

Additionally, the workflow manger can monitor a user population for the entity once a workflow or user path is activated. In particular, the user population can be defined or provided by the entity or a third party. Each user of the user population can be associated with a user profile that identifies various information associated with the user that the user has provided permission to be collected. Such information can include communication channels (e.g., e-mails, text messages, mobile applications, telephone calls, etc.) that are used by the user, user preferences, associations between the user and various products and/or services, user interests, and other indicators that enable the system to effectively direct the user towards the completion of high value actions and/or desired actions. These indicators can be associated with a purchase history of the users, an event that the users participated in, or a service (e.g. Netflix®, Hulu®, etc.) that the users use. In some embodiments, users are not static entities for the duration of individual workflows. Accordingly, the user profile can be updated as users complete activities of the workflow and other workflows that are managed by the workflow manager. In some additional embodiments, additional information can be provided by an external source that alters the user profile. Accordingly, the workflow manager can actively monitor and update user profiles to distribute updated user attributes across one or more workflows associated with the workflow manager. This permits the activities presented to the user during each workflow to be adapted to variations in user preferences, associations, and interests. Further, the workflow manager can display the updated user attributes in connection with the one or more workflows. In some further embodiments, the user profiles can be updated in real time or periodically, according to a refresh rate. Alternatively, the entity can specify a transaction rate (i.e., transactions per second, transactions per minute, transactions per hour, etc.) that imposes a limit on the refresh rate for the user profiles (i.e., updates per second equals transactions per second).

In at least one embodiment, the user profiles can be updated in real time according to indications of user or system actions associated with individual activities of the workflow. In particular, the workflow manager can monitor the workflow based on one or more indications that are transmitted by an individual activity (i.e., a communication activity or a condition activity) once certain actions have been completed or initiated. Individual indications can be associated with a single user and a single action. Accordingly, a high throughput data processor can be utilized by the workflow manager to receive the indications (i.e., user information) from the configured activities of the workflow and update the user profiles as the indications are received.

In a first example, a communication activity can transmit multiple indications for a single user that reaches the communication activity. In particular, an indication can be sent when the user reaches the communication activity, the user receives a communication/message associated with the communication activity, and when a user response and/or a user action is received by the communication activity within the workflow. Additionally, the user response can be received from the user and/or from an external resource that was instructed to obtain the user response and/or the user action by the communication activity and/or the workflow manager. Further, the communication activity can be configured to include an amount of delay time that the communication activity waits between one or more actions associated with the communication activity (e.g., a delay between the transmission of the communication to the user and the determination of the user response received).

In a second example, a condition activity can transmit multiple indications for a single user that reaches the condition activity. In particular, an indication can be sent when the user reaches the condition activity within the workflow, a determination of one or more user attributes is made, a determination of a user segment for the user is made, and the user is permitted to continue within the workflow. Additionally, the condition activity can be configured to include an amount of delay time that the condition activity waits between one or more actions associated with the condition activity (e.g., the user reaching the condition activity and the condition activity determining the user segment for the user).

It should be noted that the communication activity, the condition activity, a custom activity created by the entity, and/or other activities within the workflow can be configured to transmit an indication for any action taken by the individual activities, an individual user, and/or the workflow manager. Additionally, the entity can configure the individual activities to specify what actions will cause an indication to be transmitted. Further, the workflow manager can utilize the indications stored by the user profiles to track what user paths are associated with each user and the progress for each user within multiple user paths and/or workflows. Accordingly, the indications can inform the workflow manager of associations between individual users and one or more workflows, user paths, and configured activities. The indications can additionally confirm that individual activities have executed certain actions and that the users are progressing along individual user paths and workflows.

Further, the described systems and processes provide an extensible framework for constructing workflows via an entity device. In some embodiments, the graphical interface can display predefined activities that are utilized in user path construction for the workflows. The predefined activities can include one or more fields, variables, and filters that define how individual activities operate within a user path. In at least one embodiment, the predefined activities can be presented by the graphical interface such that individual instances can be dragged into a workspace, configured by the entity, and connected with other activities of the user path. In at least one additional embodiment, the predefined activities can include one or more connection points where additional activities can be selected and configured by the entity. In at least one further embodiment, the predefined activities can be configured by the system and assembled to form the user paths. In some additional embodiments, the graphical interface can include a framework for the entity to create new activities within the graphical interface. In particular, the graphical interface can provide a function that imports custom activities created by the entity or can provide an activity framework that can be assigned fields, filters, and variables by the entity.

Currently, individual workflows and user paths are designed through significant effort, development costs, and consumption of resources. Generally, a user path can be viewed as targeted efforts have a defined set of users, a defined schedule, and a defined message. Previously, each step of a multi-step user path could require development resources to determine how the defined message would be communicated to users during the timeframe defined by the defined schedule. Additionally, the development process produced inflexible user paths that required additional costs and resources to adapt the user path to updated user preferences, interests, and usage of products and services. Accordingly, the rigidity of prior user paths could result in fewer users participating in the high value actions or a failure to develop user engagement into completed high value actions. Further, the costs associated with developing and adapting user paths can cause a potentially lucrative user path to be foregone. Similarly, identification of user paths that are desirable can require information and analytics that are not readily available to an entity in present implementations. Accordingly, a comprehensive framework and workspace that permits multiple user paths to be monitored and managed can save development costs, identify otherwise missed opportunities, and introduce flexibility to the user paths.

Accordingly, the workflow manager described herein can construct workflows from one or more user paths that actively utilize the information determined by the activities presented to users to refine the user paths. In some embodiments, a user population can be defined by one or more user attributes that are utilized by the activities of the user paths. Additionally, the workflow manager can regularly update the one or more user attributes for each user of the user population to ensure that the activities are presented to the user based on the newest information. Additionally, the workflow manager can exchange information between individual user paths such that a change in the user attributes within a first user path can be distributed to a second user path where the user attributes are relevant. In some additional embodiments, the graphical interface and the workflow manager can be utilized to construct workflows and user paths including a plurality of sequential communication and condition activities. Additionally, the workflow can be constructed to include a plurality of branching user paths, which can in turn branch into further user paths as necessary to reach endpoints defined by the entity.

In some embodiments, the described systems and processes include a graphical interface that is presented to the entity, via the entity device, and enables the entity to create one or more workflows. As noted above, the entity can define a user population that receives activities from the workflow, based on the user paths. Additionally, the entity can construct one or more user paths from predefined and entity created activities. In some additional embodiments, defining the user population can include creating or retrieving user profiles that include user preferences, application associations, contact information, products consumed by the user, services used by the user, user interests, and other user specific information that can be utilized to configure activities to target a specific user.

In some embodiments, activities can be configured as conditions, wherein a condition can include criteria that are configured by the entity to identify users and distinguish between user segments. The conditions can be configured as entry conditions, trigger conditions, filter conditions, and other conditions that generally dictate whether a user is presented with activities from an associated user path. In some additional embodiments, the conditions can make determinations based on a binary variable, a threshold, a variable having discrete values, or a variable having continuous values. Additionally, the conditions can be configured as a filter condition that separates a user population into a plurality of user segments or further divides a user segment into a plurality of user subsegments. Further, the conditions can be configured as a trigger condition that causes a specific activity to be applied to the user segment if the trigger condition is satisfied. In at least one embodiment, the condition can determine a single batch segment of users. In at least one additional embodiment, the condition can continuously or periodically identify users and assign the users to an active user segment.

In some embodiments, the entity and/or the system itself can establish trigger conditions capable of initiating the workflows, the user paths, and other activities within the user paths. A trigger condition can be user independent, wherein the trigger condition can activate and cause a communication to be taken, one or more users to be directed to a path, and downstream conditions and/or communications to be altered for a user. Generally, user independent trigger conditions can cause an activity to be presented to the user by the workflow or user path in response to the trigger condition being satisfied regardless of the information that the user profiles include at that point. For example, a user independent trigger can be satisfied by a timeframe starting or expiring, a number of first users being presented the user independent trigger, and other information available to the workflow during operation. Similarly, a trigger condition can be user dependent, wherein the trigger condition can cause the activity to be presented based at least on information included by the user profile.

In some additional embodiments, the entity and/or the system itself can establish filter conditions capable of creating new user segments and splitting a workflow into one or more user paths. In at least one embodiment, a filter condition can be a binary filter that operates to determine which value of a binary variable is associated a user. Depending on the value of binary variable, the user segment or population that traverses the binary filter can be split into a first user segment and a second user segment. In at least one additional embodiment, a filter condition can be a multivariate filter that operates to distinguish between users based on one or more variables. Accordingly, the user segment or population that traverses the multivariate filter can be sorted into a plurality of user segments. In at least one embodiment, the user segment or population that traverses the multivariate filter can be sorted on a cascade basis, a random basis, or other logic basis that alters the priority of the filter condition when sorting individual users. As noted above with regard to trigger conditions, filter conditions can operate in a user independent or user dependent manner based on how they are defined at initialization or after an alteration.

In some embodiments, the entity and/or the system itself can establish communications that generate and/or provide content such as push notifications, email messages, and SMS messages to users. The communication can be configured to exchange information with the user or a third party. In at least one embodiment, a communication activity can be configured to generate a message that is directly transmitted to the user over a communication channel and receive a user response to the message. In at least one additional embodiment, the communication activity can be configured to transmit the message to the user and receive an indication of one or more user responses from a third party. For example, an Internet Service Provider (ISP) can send the workflow manager a notification that the user has opened an email sent by the communication activity, clicked through the email, or ignored the email (e.g., did not open the email). Additionally, an application can send the workflow manager a notification that the user has (or has not) opened the application after receiving a push notification associated with that application. In some additional embodiments, the communication can obtain user information by causing an external communication system to transmit a message generated by the communication activity and report the user response. It should be noted that the above examples are not intended to limit this disclosure, but instead provide simple examples of internal and external actions that can be performed according to a communication.

In some embodiments, a user population can be provided for the workflow and the workflow manager by the entity. Alternatively, the user population can be determined for the entity by the workflow manager according to an entry condition associated with a workflow. For example, the entry condition can be configured to determine whether individual users are associated with a predefined action such as completing a search related to an event, completing a purchase of related goods/services, and/or other predefined actions that associate the individual users with the workflow. Additionally, the entry condition can be configured to determine whether individual users are associated with a predefined attribute. In some additional embodiments, the user population can include all users that are associated with the entity or just the users that have been associated with the workflow. In at least one embodiment, the user population for the workflow is determined by the workflow manager after the workflow has been activated. In at least one additional embodiment, the user population is continuously determined for the duration of the workflow based on an entry condition. Accordingly, the workflow can be configured to receive a single input of users that satisfy an entry condition to the workflow at a specific point in time. Additionally, the workflow can be configured to receive a continuous influx of users as new users that satisfy the entry condition are identified in real-time. Further, the workflow can be configured to receive the new users that satisfy the entry condition periodically according to a refresh rate (e.g., the workflow manager identifies the new users that satisfy the entry condition every 3 days, every week, or every month). Finally, the workflow can be configured as an 'evergreen' workflow that continuously receives every new user that is associated with the entity.

In some embodiments, the user population can be assigned to user segments comprised of users sharing one or more user attributes. In at least one embodiment, a first user segment be mutually exclusive with a second user segment. For example, one or more first users are associated with a first value of a user attribute and one or more second users are associated with a second value of the user attribute. Accordingly, the one or more first users can be assigned to the first user segment based on the first value and the one or more second users can be assigned to the second user segment based on the second value. In at least one additional embodiment, the first user segment can include one or more users associated with the other user segments. For example, the one or more users can have a first user attribute required for assignment to the first user segment and a second user attribute required for assignment to the second user segment. In some additional embodiments, one or more users can be associated with multiple user segments. Additionally, the one or more users can be presented with an activity associated with the first user segment that updates the second user attribute. In response, the workflow manager can determine that the one or more users are no longer associated with the second user segment and prevent activities associated with the second user segment from being presented to the one or more users. In some further embodiments, the one or more users can be presented with the activity associated with the first user segment that updates a third user attribute. In response, the workflow manager can determine that the one or more users are associated with a third user segment and present activities associated with the third user segment to the one or more users.

In some embodiments, the workflow manager can continuously determine whether the one or more user attributes have been updated. In particular, each user can be associated with a user profile that indicates values for one or more user attributes. As noted above, a user path can update one or more of the user attributes reflect changing user preferences, application use, user interests, etc. Accordingly, the workflow manager can identify an updated user attribute, identify user attributes that define the user segments that the user is associated with, and determine whether the updated user attribute is one of the attributes that defined the associated user segments. In response to determining the updated user attribute defines a user segment, the workflow manager can assign the user to an alternative user segment or remove the association with the user segment. In at least one embodiment, an indication that a user attribute has been updated can cause the workflow manager to take action. In at least one additional embodiment, the workflow manager can continuously identify user attributes that have been updated according to a refresh rate (e.g., every minute, hourly, daily, etc.). As a result, the user segments currently associated with the user can be adapted to changing user attributes and ensure that the optimal activities are presented to the user.

In some embodiments, user segments can be configured as batch user segments or dynamic user segments. In particular, a batch user segment is a static assignment of one or more users to a user segment. The one or more users can be assigned to the user segment during a single operation and initiate the associated engagement scenario and/or user path at the same time. In comparison, a dynamic user segment receives dynamic assignments of the one or more users. For instance, the assignment of the one or more users to the user segment can be an ongoing process after the engagement scenario or user path has been initiated. Additionally, the one or more users can be removed from the user segment as one or more user attributes associated with those users are updated by activities presented to the one or more users associated with the user segment. Further, the assignment to or reassignment from the user segment can be performed in response to completion of an activity associated with the user path or based on a refresh rate assigned to the user segment or the workflow.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

FIG. 1 illustrates an example graphical interface that includes a workflow 102. For example, the workflow 102 can include one or more configured activities (i.e., configured communications and configured conditions) that increase interest and participation in a World Series® event. In some embodiments, the graphical interface can be utilized to create the workflow 102 by dragging configurable activity instances 104-112 from an activities panel 114 onto a workspace 116. The configurable activity instances 104-112 are communication and condition objects that have been defined by the entity or the workflow manager and comprise workflow 102. For example, a configured communication can send a message such as "The World Series® Starts Now!" to one or more users via email, SMS, or push notification. Similarly, a configured condition can determine whether the one or more users are associated with a user attribute. Similarly, a configured condition can require that the one or more users have an account with an MLB® application, wherein an indication that the user does have the account would be the user attribute. Alternatively, the configured condition can determine a preferred communication channel associated with the one or more users, the preferred communication channel being the user attribute. The workspace 116 is generally a portion of the graphical interface where the workflow 102 can be constructed by the entity or workflow manager from the one or more configured activities. In some additional embodiments, the configurable activity instances 104-112 can be selected by the entity and configured to connect with other activities within the workflow 102. Additionally, the configurable activity instances 104-112 can form a first user path that includes the configurable activity instances 104-110 and a second user path that includes the configurable activity instances 104-108 and 112. Generally, user paths are a series of connected activities that are associated with a user segment, wherein the user segment can include the one or more users that have the account with the MLB® application. In some further embodiments, the graphical interface can be utilized to monitor the workflow 102 while one or more users are participating in the first user path and the second user path associated with the workflow 102.

In some embodiments of FIG. 1, an information panel 118 can be configured to present information regarding the workflow 102 to the entity. As displayed by FIG. 1, the information panel 118 can include a title, a current status, a start date, an end date, a total population representing a user population, a number of users who have completed the workflow 102, and other such indications of information associated with the workflow 102. The title is a label that can be assigned to the workflow 102 that is managed by the workflow manger. The current status can indicate whether the workflow 102 is currently active or inactive. The start date can indicate a date or a time that the workflow 102 will become active (i.e., 90 days before the World Series® event). Alternatively, the workflow 102 can have the current status manually updated by the entity or the workflow manager, causing the start date to be defined as the date or time when the workflow 102 was activated. Similarly, the end date can indicate a date or time when the workflow 102 will become inactive and no longer receive additional user or prevent further activities from being presented to users. Alternatively, the end date can be defined by the entity or the workflow manager manually altering the current status to inactive (i.e., 10 days after the World Series® event).

Additionally, the user population can indicate one or more users that are currently associated with the workflow manager. In at least one embodiment, the user population can indicate the one or more users that satisfy an entry condition of configurable activity 104. For example, the entry condition can determine whether individual users are associated with a predefined action such as completing a search, completing a purchase, and/or possessing an account that relates the individual users to the configurable activity 104-112. In at least one additional embodiment, the number of users in the user population (e.g., MLB® application users) can fluctuate over time. Accordingly, the workflow manager or the entity can define a refresh rate that causes the user population to be redetermined by the workflow manager and updated to include any new users or remove any users that no longer satisfy the entry conditions. Further, the number of users that have completed the workflow 102 can include one or more users that have been presented a final activity in a user path. In at least one embodiment, the number of users that have completed the workflow 102 can be the number of users that have been presented with configurable activity 110 or configurable activity 112.

In some additional embodiments of FIG. 1, the information panel 118 can display additional workflow data (e.g., a workflow category, a workflow duration, etc.), entity data, or user data associated with the workflow 102. In particular, the information panel 118 can display user data relating to the completion of individual communication and/or filter activities that comprise the workflow 102. Additionally, the information panel 118 can be configured to display workflow level metrics and analytics relating to the user population associated with the workflow 102. In at least one embodiment, an additional information panel can be displayed in addition to or in place of information panel 118. For example, the additional information panel can display information regarding a specific user path, activity, or user. Additionally, the additional information panel can display information specific to individual activities of the configurable activities 104-112 within the workspace 116. Further, the additional information panel can display information regarding the number of users that are currently interacting with the individual activities, user segments that are associated with the individual activities, and/or other activity metrics and analytics.

In some embodiments of FIG. 1, the activities panel 114 can list one or more predefined activities that can be configured by the entity. In particular, the activities panel 114 can list one or more communications including a send email communication 120 that causes the workflow manager to transmit an email to the user, a send push communication 110 that causes the workflow manager to transmit a notification to the user via an application or webpage, and a send SMS communication 112 that causes the workflow manager to transmit an SMS to the user via a network. The one or more communications included in the activities panel 114 are not intended to be limiting and can further include communications such as a request information communication that causes the workflow manager to retrieve a user attribute from a server and an update user profile communication that causes the workflow manager to update the user profile with a user response.

Additionally, communications can cause the workflow manager can utilize a simple email service (SES) or a similar service associated with SMS and push notifications to send messages (e.g., email, SMS, push notifications, etc.). In some embodiments, the SES or similar service can include an indication that the message was sent by the workflow manager. The indication can further cause the user response to the message to be recorded and returned to the workflow manager so that the user response can be stored as a user attribute. Accordingly, the workflow manager can be informed by the SES, the similar services associated with SMS and push notifications, an Internet Service Provider, or other messaging gateway how the user responded to the message (e.g., message was opened, received, ignored, bounced, etc.)

Further, the send email communication 120 can be dragged into the workspace 116 or selected within the activities panel 114 to create a new communication instance, such as configurable activities 106 and 110. Similarly, the send push communication 122, the send SMS communication 124, and other communications can be dragged into the workspace 116 or selected within the activities panel 114 to create new communication instances, such as configurable activity 112. In some embodiments, the user profile can include a user preference that indicates a preferred communication channel (e.g., email, SMS, push notification). Alternatively, the system can identify the preferred communication channel by determining the communication channel that the user uses to retrieve content, open messages, and receive notifications. In some further embodiments, the entity can configure user engagement content, such as a message, an offered promotion, or a notification, that can be transmitted by the new communication instance. Alternatively, the entity can configure user engagement content templates that are stored by a content database. The user engagement content templates can include rules for generating messages sent through one or more communication channels, transmitting notifications, and determining promotion offers. In at least one embodiment, workflow manager can configure the user engagement content transmitted according to the rules for generating user engagement content based on one or more user attributes associated with the user profiles. In at least one additional embodiment, the entity or the workflow manager can determine a communication source (e.g. an email address, a phone number, or an application that transmits the content of the communication) that can be displayed to the user with the transmitted user engagement content. Each of the above communications can be configured with a destination (e.g. a user phone number, a user email address, a remote server, etc. that receives the content of the communication).

In some embodiments of FIG. 1, the activities panel 114 can list one or more conditions including an entry trigger 126, a binary split 128, a multivariate split 130, and a random split 120. The one or more conditions that are included by the activities panel 114 are not intended to be limiting and can further include additional conditions such as an exit condition, a termination condition, and a hold segment condition. In particular, the entry trigger 126, the binary split 128, the multivariate split 130, the random split 132, and other conditions can be dragged into the workspace 116 or selected within the activities panel 114 to create a new condition instance, such as configurable activity 104 and 108. The new condition instance can be configured by the entity or the workflow manager. In at least one embodiment, the new condition instance can be the entry trigger condition 126 that determines whether an attribute associated with a user profile has a specified value.

As shown by FIG. 1, the entry trigger condition 126 can cause a subsequent communication, send email communication 106, to occur based on the entry trigger condition 104 being satisfied. As noted above, the entry trigger condition 126 can determine whether a user attribute is associated with a user (e.g., an active subscription to a service, a mobile application account, the user has purchased tickets). However, other trigger conditions can determine that other user attributes that are known to the entity or the workflow manager are associated with the user (e.g., the user received a previous communication, the user opened an email, the user viewed a push notification, the user responded to an SMS). For instance, the entry trigger condition 126 can be configured to determine user interest in the World Series® event based on user web searches, user participation in prior World Series® events, or user possession of an MLB® application account. Alternatively, the entry trigger condition 126 can be configured to delay the presentation of further activities until a timeframe has expired, such as a specified date has passed, a timer has expired, a deadline has passed, or an amount of time has passed since a user action. For example, the entry condition 104 can wait until 30 days before the World Series® to present the send email communication 106 to the user by causing the workflow manager to send the associated email.

In some further embodiments of FIG. 1, the binary split 128 and the multivariate split 130 can be abstracted to a conditional split. In particular, an entering user segment can be split according to one or more variables that are defined when the conditional split is configured by the entity or the workflow manager. As shown by configurable object 108, the binary split 128 can split the entering user segment (i.e., MLB® application users) according to a variable (i.e., a user attribute) with two possible values (i.e., email was opened and email was not opened). The binary split 128 can assign individual users to a first user segment (i.e., users that opened the email) or a second user segment (i.e., users that did not open the email). In at least one embodiment, the variable can be whether an incident has occurred. If the incident has occurred, the user is assigned to the first user segment and if it has not, the user is assigned to the second user segment. For example, the determination can be whether an email has been sent, the user responded to the email, or the user unsubscribed from a service. In at least one additional embodiment, the variable can be a user attribute with only two possible values.

In some embodiments of FIG. 1, the binary split 128 and the multivariate split 130 permit the workflow manager and the entity to tailor the user experience for each individual user. In particular, determining that the user has responded to an email can indicate user interest in the subject matter of the email and a willingness to participate in the workflow 102. Accordingly, the entity can configure a user path associated with only customers that have responded to the email to include additional email messages regarding an event (e.g., the World Series®). Ultimately, the workflow 102 can be configured to increase the occurrences of high value activities such as users purchasing World Series® tickets, watching the World Series® on television, and purchasing MLB® merchandise. In contrast, determining that the user has not responded to the email can assign the user to a separate user path configured to connect with the user through different means. For example, if the user has not responded to the email, the entity can configure the separate user path to send notifications to the user via a mobile application. The separate workflow can further split as a preferred experience is determined for the user based on the user attributes determined by the system and guide the user towards the high value activities associated with the event.

In some embodiments of FIG. 1, the activities panel 114 can include a create activity option 122. In at least one embodiment, the create activity option 122 opens an additional workspace where the entity can define a custom communication or a custom condition within the graphical interface. The entity can assign one or more variables and one or more actions to the custom communication or the entity condition that can be performed during a user path. In at least one additional embodiment, the create activity option can allow the entity to configure a lambda function that references custom code supplied by the entity that defines the custom communication or the custom condition. After the create activity option 122 is utilized to configure the custom communication or the custom condition, a custom activity can be stored within the activities panel 114 for later use in creating the workflow 102 or the user path.

Figure 2:
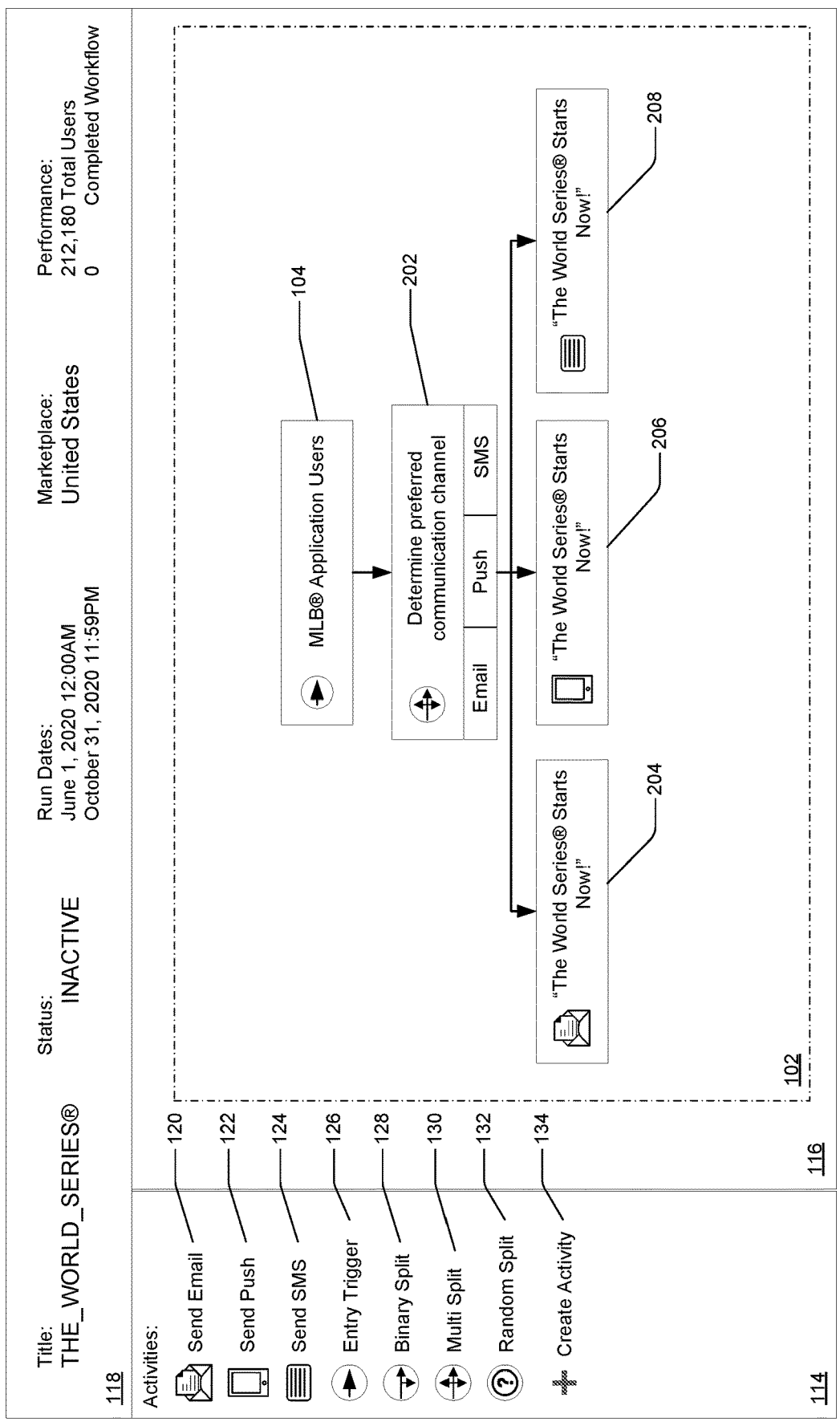
FIG. 2 illustrates an example graphical interface where an entity has configured a multivariate split to assign users to user paths based on discrete user attribute values.

FIG. 2 illustrates the example graphical interface of FIG. 1 where the entity configures the workflow 102 to include a multivariate split 202 (i.e., multi split, multivariate condition). Similar to the binary split 128, a multi split 202 can be configured to split an entering user segment into a plurality of new user segments. For example, the entity can identify thresholds (e.g., user has opened MLB® application in the last 30 days), value ranges (e.g., user has attended a World Series® event in between 2010 and 2018), and discrete values (e.g., user preferred communication channel is email, push notification, or SMS) associated with a user attribute (e.g., MLB® application use, World Series® attendance, preferred communication channel). Based on the user attribute associated with the user, the multivariate split 202 can assign the user to a specified user segment. Alternatively, the entity can configure the multivariate split 202 to assign the user to the specified user segment based on whether an incident associated with the user has occurred (e.g., user has received "The World Series Starts Now!" email).

In some embodiments of FIG. 2, each user of the user segment including MLB® application users can be assigned to a user path by the multivariate split 202. In particular, the multivariate split 202 can determine, based on a user attribute that indicates a preferred communication channel of individual users, the user path appropriate for the individual users. Accordingly, the individual users associated with a preferred communication channel user attribute that indicates a preference for emails, the individual users can be presented with configured communication 204 that causes the workflow manager to transmit an email reading "The World Series Starts Now!" to the email address associated with the MLB® application account of the user. Additionally, the individual users associated with a preference for push notifications will be presented with configured communication 206 that causes the workflow manager to transmit a push notification (e.g., a notification sent via the MLB® application) to the user. Further, the users associated with a SMS preference will be presented with configured communication 208 that causes the workflow manager to transmit a SMS message to the phone number associated with the MLB® application of the user.

Figure 3:
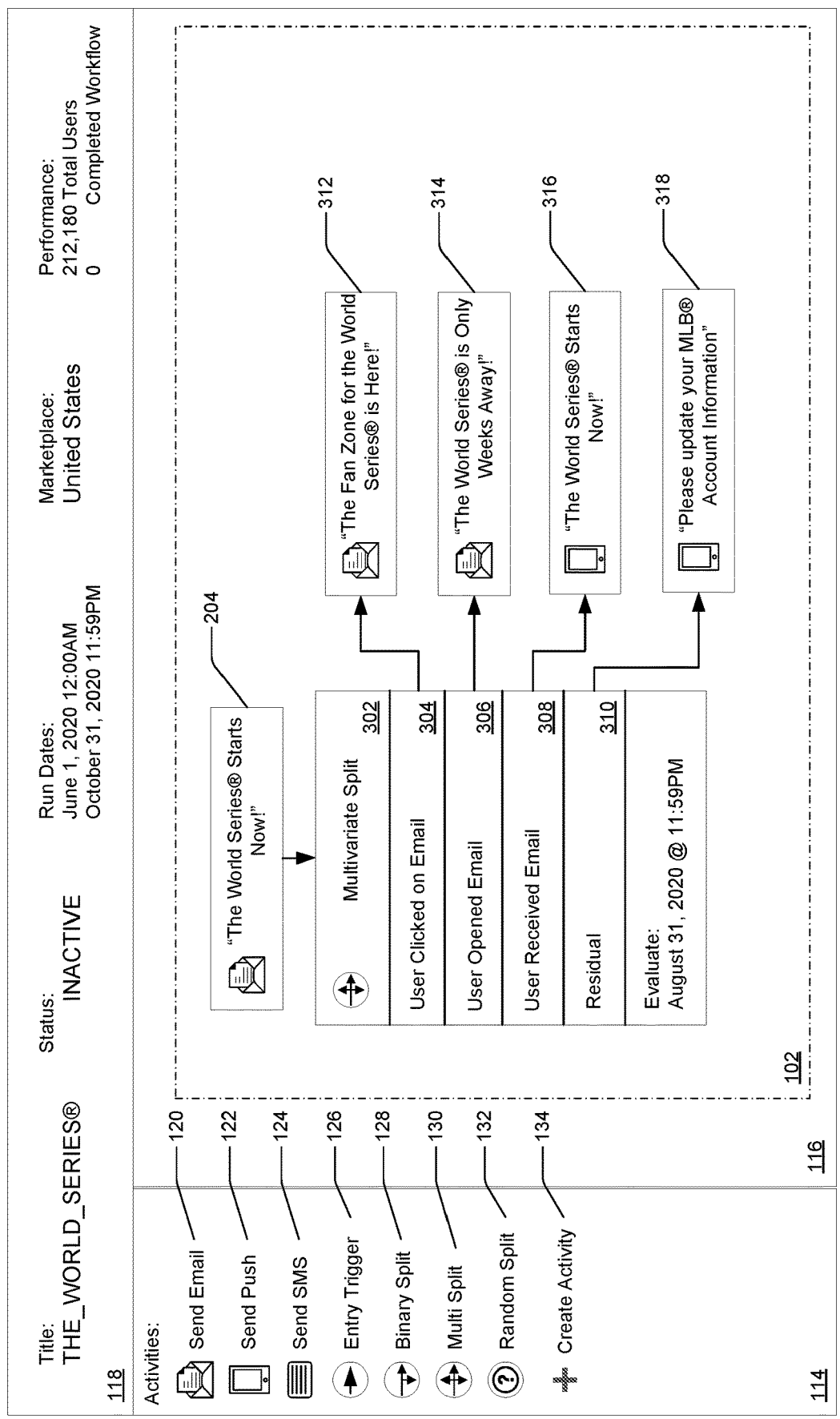
FIG. 3 illustrates an example graphical interface where an entity has configured a multivariate split to assign users to user paths on a cascade basis that gives sequential priority to a first branch, a second branch, a third brand, and ultimately a residual branch.

FIG. 3 illustrates an example graphical interface where an entity has configured a multivariate split 302 to assign users to user paths on a cascade basis that gives sequential priority to a first branch 304, a second branch 306, a third brand 308, and ultimately a residual branch 310. As noted above, the cascade basis first determines whether the user satisfies one or more criteria of the first branch 302. For example, multivariate split 302 can first determine whether the user presented with the configured communication 204 has opened the email (i.e., "The World Series Starts Now!). If the user satisfies the first branch 304 (i.e., has clicked within the email), the user is assigned to the first user segment. Otherwise, the multivariate split 302 progresses through one or more additional branches until the user is assigned to one of the additional user segments or is assigned to a remainder user segment. For example, multivariate split 302 can also determine whether the user has opened the email or only received the email. If the user has received and opened the email, the user can be assigned to a second user segment associated with the second branch 306. Alternatively, if the user has only received the email, the user can be assigned to a third user segment associated with the third branch 308. Further, the multivariate split 304 can be configured to include the residual branch 310 that receives all users not assigned to the first branch 304, the second branch 306, and the third branch 308. As noted above, the first branch 304, the second branch 306, the third branch 308, and the residual branch 310 can assign the individual users to user segments that are subsequently presented with user paths associated with each branch. Alternatively, one of the branches can be configured as an exit branch that removes the user from the workflow 102.

In some embodiments of FIG. 3, the first branch 304 can cause an email communication 312 to be presented to the users that have received, opened, and clicked on the email transmitted by the email communication 204. For example, upon determining that the users of the first branch 304 have clicked on prior emails from the workflow 102, the email communication can cause the workflow manager to transmit a second email (i.e., "The Fan Zone for the World Series® is Here!") to the email address associated with the MLB® application account of the user. Additionally, the email communication 312 can be the first communication of a series of activities presented to the users associated with the first branch 304. Similarly, the users associated with the second branch 306 can be presented with email communication 314 and ultimately receive an email reminding them that "The World Series is Only Weeks Away!" Further, the users associated with the third branch 316 can be presented with email communication 316 and ultimately receive a push notification (i.e., a notification receive via the MLB® application) informing them that "The World Series® starts now!" Finally, the users that are assigned to the residual branch 318 can be prompted, via an alternative push notification to update their MLB® application account information.

In some embodiments of FIG. 3, the multivariate split 302 can be configured to execute only a single time. Accordingly, the entity or the workflow manager can configure the multivariate split 302 to wait until a specific date has passed (e.g., Aug. 21, 2020 at 11:59 PM), a timer expires (e.g., 24 hours after the user reaches the multivariate split 302), or a deadline passes (e.g., 30 days before the next World Series®). Alternatively, the multivariate split 302 can be configured to execute immediately upon presentation to the user. Further, the multivariate split 302 can be configured to periodically execute based on a refresh rate.

In some embodiments of FIG. 3, the entity can determine that the different actions that are considered by the multivariate split 302 indicate different levels of user interest in the email message 204. For example, the entity can determine that users that click on the email are associated with higher levels of interest in the content of the email message (e.g., "The World Series® Starts Now!") and would be willing to participate in additional events (i.e., the Fan Zone) related to the primary event (i.e., the World Series®). Additionally, the entity can determine that users that only open the email are interested, but require additional engagement (i.e., indicating that the World Series® is happening in the near future) to generate additional interest before an addition event (i.e., the Fan Zone) is introduced. Further, the entity can determine that users that do not react to the email message 204 are not appropriately targeted by the email message and can attempt to engage the user through a different pathway (i.e., sending a mobile application push notification). Finally, the entity can determine that the residual path indicates a further problem beyond how the user reacts to the email message 204 and attempt to remedy whatever the underlying problem is (i.e., determining whether the contact information for the user is correct).

Figure 4:
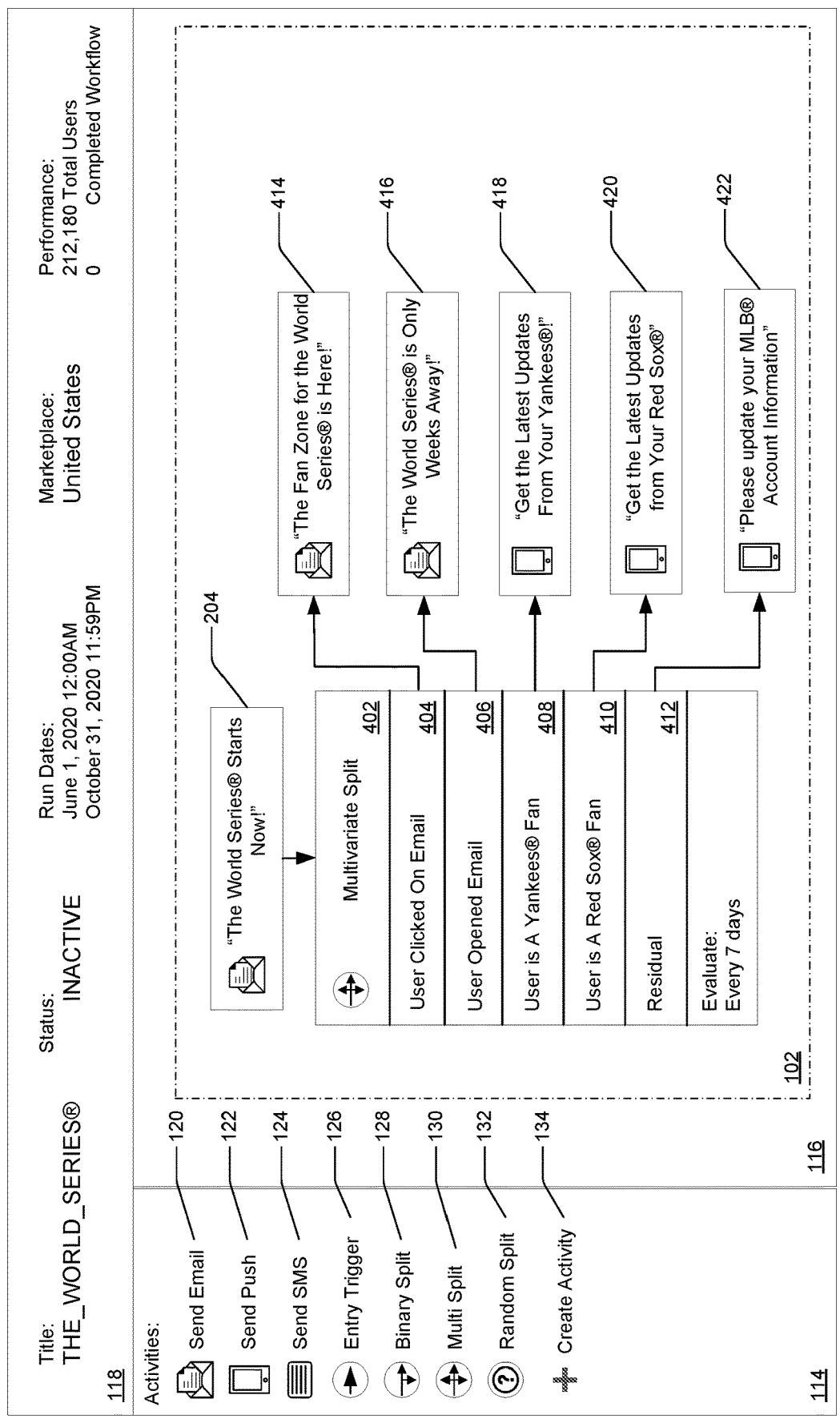
FIG. 4 illustrates an example graphical interface where an entity has configured a multivariate split to assign users to one or more user paths based on either a prior incident in the user path or a user attribute previously unassociated with the user path.

FIG. 4 illustrates an example graphical interface where an entity or a workflow manager has configured a multivariate split 402 to assign users to one or more user paths based on either a prior incident in the workflow 102 or a user attribute previously unassociated with the workflow 102. In some embodiments, the multivariate split 402 can be configured to assign individual users to user paths based on both incidents (e.g., user has clicked on an email or opened the email) and user attributes (e.g., whether the user is a Yankees® or Red Sox® fan). In at least one embodiment, the workflow manager can operate the workflow 102 and an additional workflow simultaneously for the user population. In at least one additional embodiment, the user attributes (e.g., Yankee® fan or Red Sox® fan) can be previously unassociated with the workflow 102. Accordingly, the multivariate split 402 can assign the individual users based on prior incidents of the workflow 102, the users being associated with other user segments (e.g., user segment defined by the user attributes Yankees® fan or Red Sox® fan), and user attributes otherwise unassociated with the workflow 102.

In some embodiments of FIG. 4, and similar to the multivariate split 302, the multivariate split 402 can determine whether a first branch 404, a second branch 406, a third branch 408, or a fourth branch 410 is satisfied by the user and is presented with email communication 414, email communication 416, push notification communication 418, or push notification 420 respectively. Otherwise, the user falls into a residual branch 412 and receives push notification communication 422. In some embodiments, the multivariate split 402 can determine that the user satisfies multiple branches that are not mutually exclusive. For example, the user can satisfy the "clicked on email" requirement of the first branch 404 and be associated with the "Yankees® fan" user attribute required by the third brank 408. Accordingly, the multivariate split 402 can assign individual users to multiple user paths associated with branches that do not have mutually exclusive branches. Alternatively, the multivariate split can be configured such that branches that are not mutually exclusive cannot be assigned the same individual. For example, the entity or workflow manager could configure the multivariate split 402 such that a user that satisfies the first branch cannot be associated with the user path and communications subsequent to the second branch.

In some embodiments of FIG. 4, the multivariate split 402 can evaluate an entering user population or user segment periodically (e.g., every 7 days) and determine which branch is satisfied by the individual users should be assigned to.

Accordingly, the periodic evaluations permit updated user attributes the user to adjust the user path for that user. For example, during an initial assignment for the user, the user can have a first value for the user attribute that indicates the user is a Yankees® fan. Accordingly, the user satisfies the third branch 408 of the multivariate split 402 and receives configured communication 418 according to the user path associated with the third branch 402. However, after 7 days, the user could have altered their preferences and can have a second value for the user attribute that indicates the user is now a Red Sox® fan. Accordingly, the multivariate split 402 can reassign the user and present the user with configured communication 420. Further, the multivariate split 402 can disassociate the user the user path associated with the third branch 408.

In some embodiments of FIG. 4, and in addition to the entity considerations recited above with regards to FIG. 3, the entity can configure the first branch 404 and the second branch 406 using similarly logic regard the user interest indicated by the user action in response to the email message 204. However, instead of simply transmitting the same message via different communication channels, the entity can attempt to pursue a different path to interact with the user. Accordingly, the entity can configure the multivariate split 402 to consider whether the user is associated with particular attributes relevant to the event. For example, if the World Series® involves the Yankees® and the Red Sox®, the entity can determine that incentivizing the user to use the MLB® application is a better response to the user only receiving the email. Additionally, the entity can configure the multivariate split 402 to determine whether the user is associated with particular user attributes (e.g., user is a Red Sox® fan or a Yankees® fan). Further, the entity can then cause the third branch 408 to present push notification 418 or the fourth branch 410 to present push notification 420 depending on whether the user is a fan of either team. In some additional embodiments, the entity can determine that presenting users with multiple user paths (e.g., user both clicked on the email and is a Yankees® fan, so they receive both email 414 and push notification 418) results in an increased number of completed high value activities.

It should be noted, with respect to FIGS. 1-4, that despite the workflows described including only a single condition activity associated with a plurality of communication activities, a workflow can include a plurality of condition activities. While the user attributes associated with the user population are tracked throughout the one or more described workflows, the workflows themselves can be expanded to include a sequence of related activities that direct the user population and/or the user segments towards one or more endpoints defined by the entity. Accordingly, numerous activities can be connected in a sequential path and/or numerous branching paths according to the instructions provided by the entity.

Figure 5:
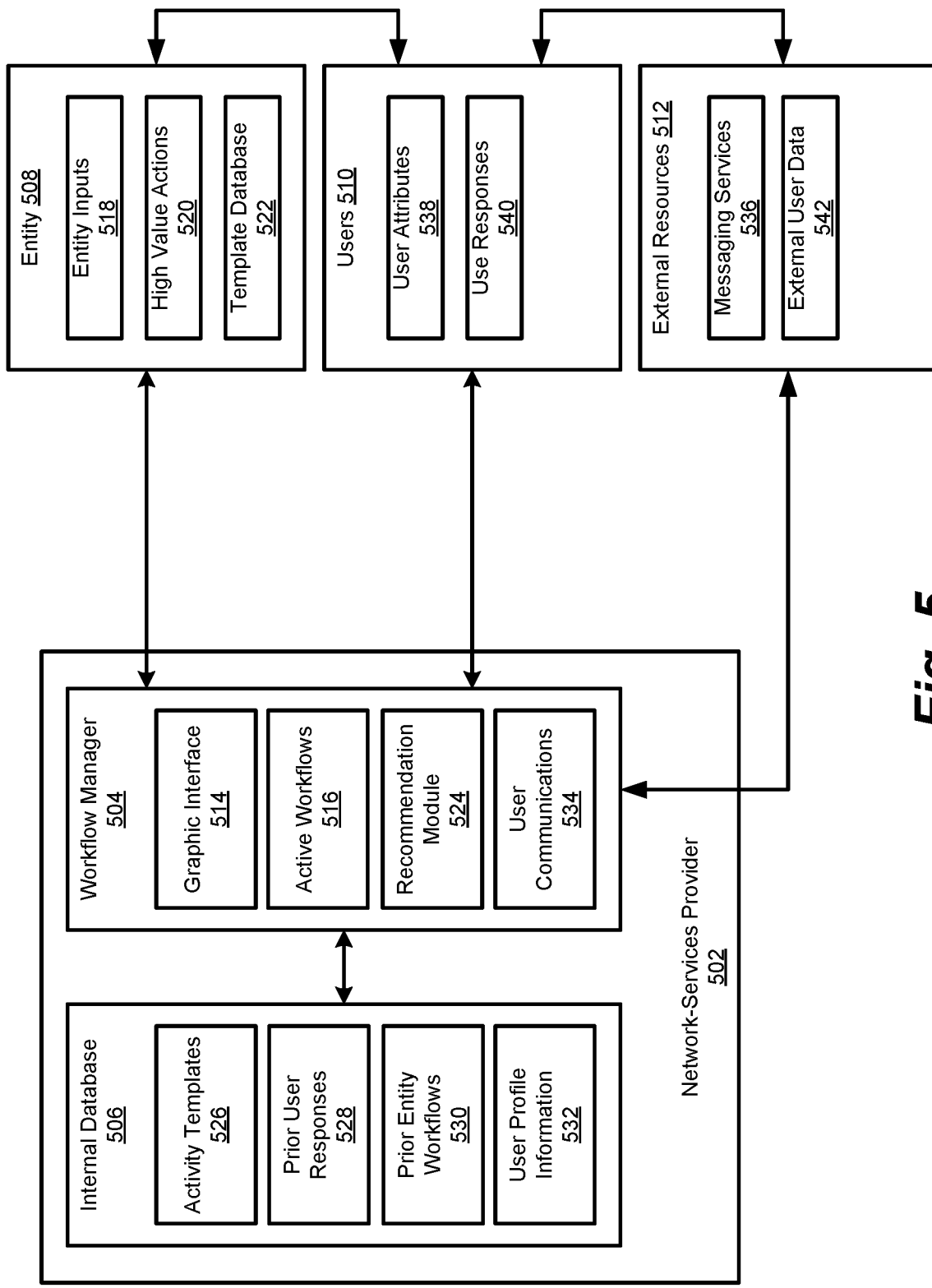
FIG. 5 illustrates an architecture diagram showing aspects of the configuration of a workflow manager that constructs graphical interfaces representing workflows that present treatments to users and retrieve information from internal and external servers.

FIG. 5 illustrates an architecture diagram showing aspects of the configuration of a network-services provider 502 that hosts a workflow manager 504 and an internal database 506. Additionally, the workflow manager 504 can be configured to exchange information with the internal database 506, an entity 508, one or more users 510, and one or more external resources 512.

In some embodiments of FIG. 5, the workflow manager 504 is configured to construct, manage, and monitor active workflows associated with the entity 508, which may or may not be a customer of the network-services provider 502. In particular, the workflow manager 504 can present a graphical interface 514 that displays one or more active workflows 516 and enables the entity 508 to provide one or more entity inputs 518 that directly configure the active workflows 516. The graphical interface 514 can be further configured to display predefined components that can construct the active workflows 516, display information collected from the active workflows 516 by the workflow manager 504, and present analytics regarding the active workflows 516. Additionally, the graphical interface 514 can be configured to receive entity inputs 518 that configure the active workflows 516 and define high value actions 520 (i.e., desired actions). Further, the workflow manager 504 can access a template database 522 associated with the entity 508.

In some embodiments, the template database 522 can store entity defined templates the can be configured by the workflow manager 504 to create components of the active workflows 516. For example, the template database 522 can include a promotional offer bank that lists the promotional offer templates that can be utilized by an active workflow 516 to generate a promotional offer communication (e.g., "10% off all MLB® merchandise purchases") that can be presented to users 510. Additionally, the template database 522 can indicate prerequisites associated with an entry in the promotional offer bank. The template database prerequisites can be utilized by the workflow manager 504 to configure filter conditions and trigger conditions (e.g., entry conditions, binary splits, multivariate splits, etc.) that comprise the active workflows 516. In some additional embodiments the template database 522 can be utilized by a recommendation module 524 to generate configured activities from activity templates 526 and user attributes 538. Generally, the recommendation module 524 can present recommended activities and workflows from the activities templates 526 and the template database 522. For example, the activities templates 526 and the message templates acquired from the template database 522 can be configured based on, the prior user responses 528, prior entity workflows 530, and user profile information 532 stored by internal database 506. Alternatively, the recommendation module 524 can perform validation activities and recommend corrections based on the template database 522, the activities templates 526, and/or the prior entity workflows 530 stored by the internal database 506. In particular, before a workflow is published and/or activated, the recommendation module 524 can analyze the workflow and provide recommendations for unused user attributes, identified user segments, unused activities templates associated with the workflow or related workflows, partially configured activities, and other pre-existing conditions within the workflow.

In some embodiments, the workflow manager 504 can present user communications 534 from the active workflows 516 to the users 510. In particular, the workflow manager 504 can transmit the user communications 534 directly from the network-services provider 502 to the users 510. Additionally, the workflow manager 504 can transmit the user communications 534 to the users 510 via messaging services 536 associated with the external resources 512. Further, the workflow manager 504 can indicate that the external resources 512 are to collect user attributes 538 determined by the user communications 534 and return user responses 540. In at least one embodiment, messaging services 536 include a simple email services (SES) that is configured to identify multiple actions (e.g., the user opens the email, the user receives the email, the user clicks on the email, etc.) a user performs regarding the user communication 534 (i.e., an email message) and provide the workflow manager 504 a summary of the user responses 540. In at least one additional embodiment, the user communication 534 can be an information request that is transmitted to the external resource 512. In response, the external resources 512 can provide external user data 542. For example, the external resources 512 can be a database, associated with the entity 508, storing the external user data 542 that was not previously provided by the entity 508 (e.g., the information was collected by the entity 508 after the active workflows 516 were constructed).

In some embodiments, the workflow manager 504 can be configured to monitor the one or more users 510, one or more active workflows 516, and the user communications 534. In particular, the one or more active workflows 516 and/or the user communications 534 can be configured to transmit indications that report user actions associated with individual active workflows, communications, and/or other activities. The information reported by these indications can be collected and utilized to generate analytics summarizing user actions related to the one or more active workflows 516 and the user communications 534 received by the one or more users 510.

Figure 6:
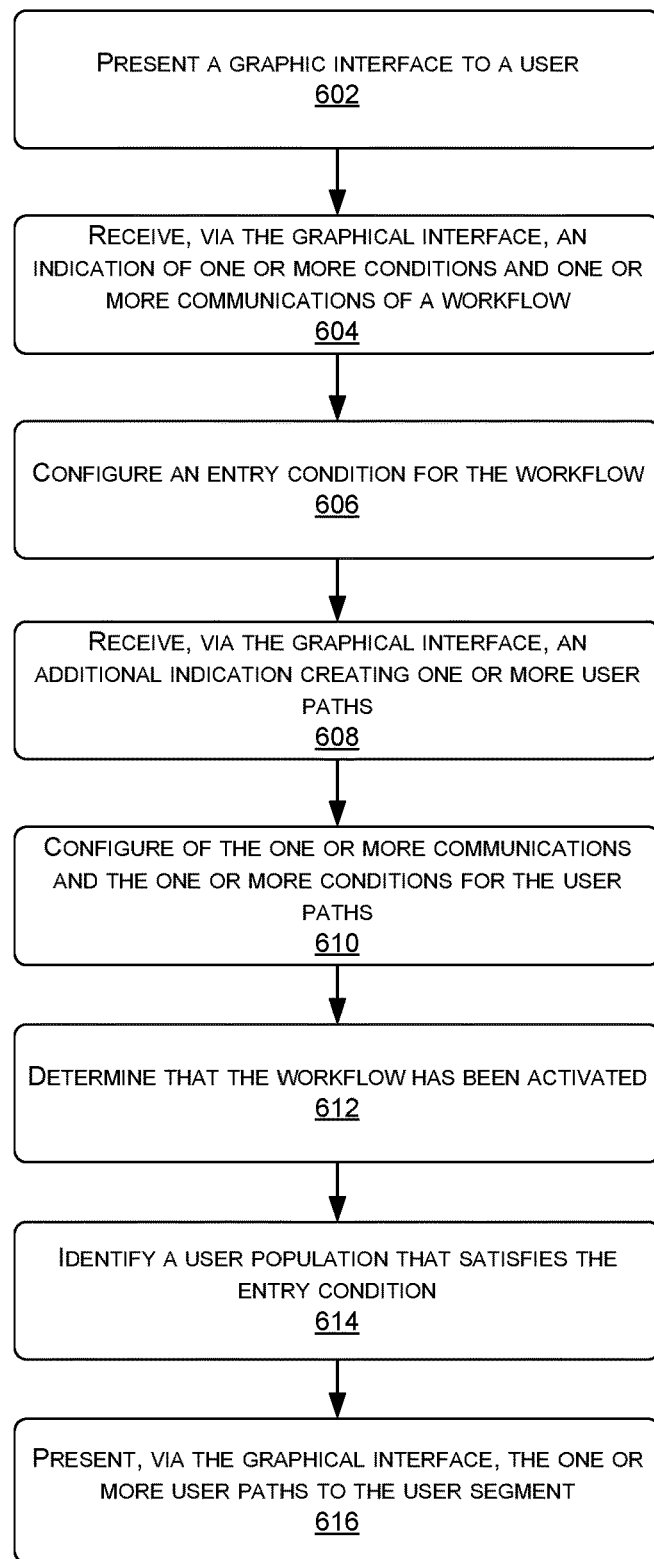
FIG. 6 illustrates a method for utilizing a graphical interface to construct a workflow comprised of a series of activities and causing a workflow manager to automatically execute and monitor one or more conditions and one or more treatments.

FIG. 6 illustrates a method for utilizing a graphical interface to construct a workflow comprised of a series of activities and causing a workflow manager to automatically execute and monitor one or more conditions and one or more communications. At block 602, a graphical interface can be presented to an entity. For example, FIGS. 1-4 display example graphical interfaces. In particular, the graphical interface presented to the entity can be configured to display a plurality of activities, including conditions (e.g., entry conditions, trigger conditions, binary split conditions, multivariate split conditions) and communications (e.g., send email communication, send SMS communication, send push notification communication). The displayed activities can represent activity templates that are individually selectable by the entity such that new, configurable instances can be added to a workspace of the graphical interface.

At block 604, the graphical interface receives an indication or a selection of one or more conditions and one or more communications that the entity is adding to the workflow. In some embodiments, the graphical interface can have a drag and drop functionality that enables users to select an activity template and drag the template to the desired location within the workflow being constructed by the entity. In some additional embodiments, each condition and each communication can be configured to have one or more connection points. Connection points can be indicated by a "+" symbol or other symbol that branches off of the template in the graphical interface. In some further embodiments, the entity can construct multiple workflows within the graphical interface. In at least one embodiment, a new workflow can be created by simply generating a new entry condition within the graphical interface that remains independent of other activities that have been defined by a user. In at least one additional embodiment, a first workflow can be connected with a second workflow to present a common activity to a first user segment associated with the first workflow and a second activity associated with the second workflow. After the workflow manager has presented the common activity to the first user segment and the second user segment, the workflows can continue to independently handle the user segments.

At block 606, an entry condition can be configured by the entity for the workflow. As previously noted with respect to FIGS. 1-4, the entry condition can utilize a user attribute associated with one or more user profiles to identify a user population that will participate in the workflow. Alternatively, the graphical interface can receive a preconfigured user population from the entity that is presented the workflow in response to a timeframe required by the entry condition. For example, the entity can provide a database including all MLB® application users to the workflow managers and configure the entry condition to present the workflow to the MLB® application users 30 days before the World Series®. Accordingly, the user population for the workflow is the MLB® application users and the timeframe is 30 days before the World Series®. Alternatively, the entity can configure the workflow to be presented to the MLB® application users that have opened the MLB® application within the last 30 days. Accordingly, the user population is a dynamic population that can receive additional users during the operation of the workflow. Accordingly, the entry condition can be configured to periodically determine, based on a refresh rate (e.g., every 10 days, every 30 days) set by the entity, whether any additional users have been added to the population. Alternatively, the workflow manager can monitor all MLB® application users and determine in real time whether any additional users have been added to the population. Accordingly, the workflow manager can continuously identify, from the users associated with the entity, a constant influx of new users or batches of new users from to be added to the user population of the workflow.

At block 608, the workflow manager can receive additional indications creating one or more user paths via the graphical interface. In particular, user paths can be viewed as individual series of activities (communications and conditions) that share user attribute prerequisites required by a user segment comprised of one or more users and associated with the user path. It should be noted that the one or more users can be associated with additional user attributes that are not prerequisites associated with the user path and the user segment. Similar to user populations, user segments can be static or dynamic. For example, a static user segment can be predefined by the entity via the graphical interface or a database associated with the graphical interface. Alternatively, a dynamic user segment can be associated with one or more require user attributes. Accordingly, a filter condition such as a binary split or a multivariate split can continuously (i.e., real time), periodically (i.e., according to a refresh rate), or nonperiodically (i.e., according to a particular incident) operate to identify additional users to be added to the dynamic user segment. In at least one embodiment, an additional filter condition can operate to trigger a communication that causes the user communication required by the user segment to be updated such that the user no longer satisfies the user attribute requirements of the user segment. For example, a first user path can require an active MLB® application account. Additionally, a second user path can determine that a user associated with the first user path has deleted their MLB® application account and no longer satisfies the requirements of the first user path. Accordingly, the user can be removed from the first user path to save computation time. Further, the user can be presented with a third user path configured to re-engage the user (i.e., incentivize the user to reopen their MLB® application account) in response to the user being removed from the first user path.

At block 608, configuring one or more communications can include configuring send email communications, send SMS communications, and send push notification communications. For example, the entity can drag an instance of the send email communication into a first user path or otherwise insert the send email communication. Additionally, the entity can be required to configure the send email communication by either creating an email template (e.g., an email HTML template) or selecting a preconfigured email template associated with the entity. The entity can configure the email content (e.g., "The World Series Is Now!"), the user segment that will receive the email content (e.g., the user segment has preferred the email communication channel), and a timer or a deadline that delays transmission of the email. Further, during the configuration of the send email communication, the entity can preview the email message, send a test email to an internal email address, and confirm that the email displays the correct message. While the above discussion specifies the configuration of the send email communication, similar features can be provided for a send SMS communication and a send push notification communication In some additional embodiments, the message (e.g., email, SMS, push notification) can be configured to include an indicator that the message was transmitted by the workflow manager. In response to the indicator, an external messaging service can provide the workflow manager with user responses to the message that would not otherwise be reported to the workflow manager. For example, a push notification communication is configured to send the message (e.g., "Stay Updated With The Latest From Your Yankees®!") via an application (e.g., the MLB® application). Accordingly, the application can provide indications that the user response to the message was to open the message, dismiss the message, ignore the message (i.e., has not interacted with the push notification), or to open the application. In another example, a send email communication can send an email message that includes a link or other click-able content. Base on the indicator that the workflow manager associated with the email message, a simple email service (SES) or an Internet Service Provider (ISP) can determine whether the user opened the email, deleted the email, clicked on the link in the email, and other user interactions with the email message.

In some further embodiments, a condition can be configured to split the user population associated with the workflow or the user segment associated with the user path into a plurality of new user segments. Additionally, the condition can be configured to assign individual users associated with a specified user attribute to one or more user paths and remove any remaining users from the workflow or the user path. Further, the condition can be configured such that each branch of the condition causes a particular communication, but does not assign individual users to the plurality of new user segments. For example, the condition can be configured to determine a preferred communication channel (e.g., email, SMS, push notification, etc.) associated with a user segment (e.g., MLB® application users). Based on a user attribute indicating the preferred communication channel, the individual users can be presented with a send message/transmit message communication (e.g., users preferring emails are presented with an email message "The Fan Zone is Here!") associated with the preferred communication channel and continue to be presented with the user path associated with the user segment (e.g., the user segment receives a Fan Zone portal in the MLB® application).

At block 612, the workflow manager can receive an entity input that activates the workflow constructed and configured by the preceding blocks. As a result, the workflow manager can update the graphical interface to display the workflow that has been activated. In some embodiments, each condition and each communication can display a number of users that are in the process of being presented with the configured actions. For example, the entry condition for the workflow can show the number of users that have passed the entry condition or the number of users waiting to be evaluated by the entry condition. In some additional embodiments, the workflow manager can monitor the user population for the workflow to identify the individual users associated with one or more user attributes that have been updated and record the one or more user attributes in a user profile associated with the individual users.

At block 614, the workflow manager can identify the user population for the workflow based on the entry condition that was configured by the entity in block 606. As noted above, as new users are added to the user population, they can be presented with subsequent communications and conditions as they are discovered in real time or the subsequent communications and conditions can be delayed so that they are presented to batches of users.

At block 616, the workflow manager can present the one or more user paths to the user and display progress via the graphical interface. The workflow manager can provide the entity with real time analytics that indicate user responses to the configured communications and identify the breakdown of the user population into consume segments by the configured conditions. For example, the real time analytics regarding the user responses can be presented as a number of users associated with individual communications and conditions of the workflow. The association between communications, conditions, and users can be tracked and reported via the graphical interface as the user population and the user segments progress through the workflow. Additionally, the real time analytics can indicate one or more user attributes associated with one or more user segments, communications, and conditions. Generally, analytics and metrics regarding the experiences of individual users and/or user segments associated with the workflow can be actively determined by the workflow manager and presented, via the graphical interface and an entity device, to the entity.

Figure 7:
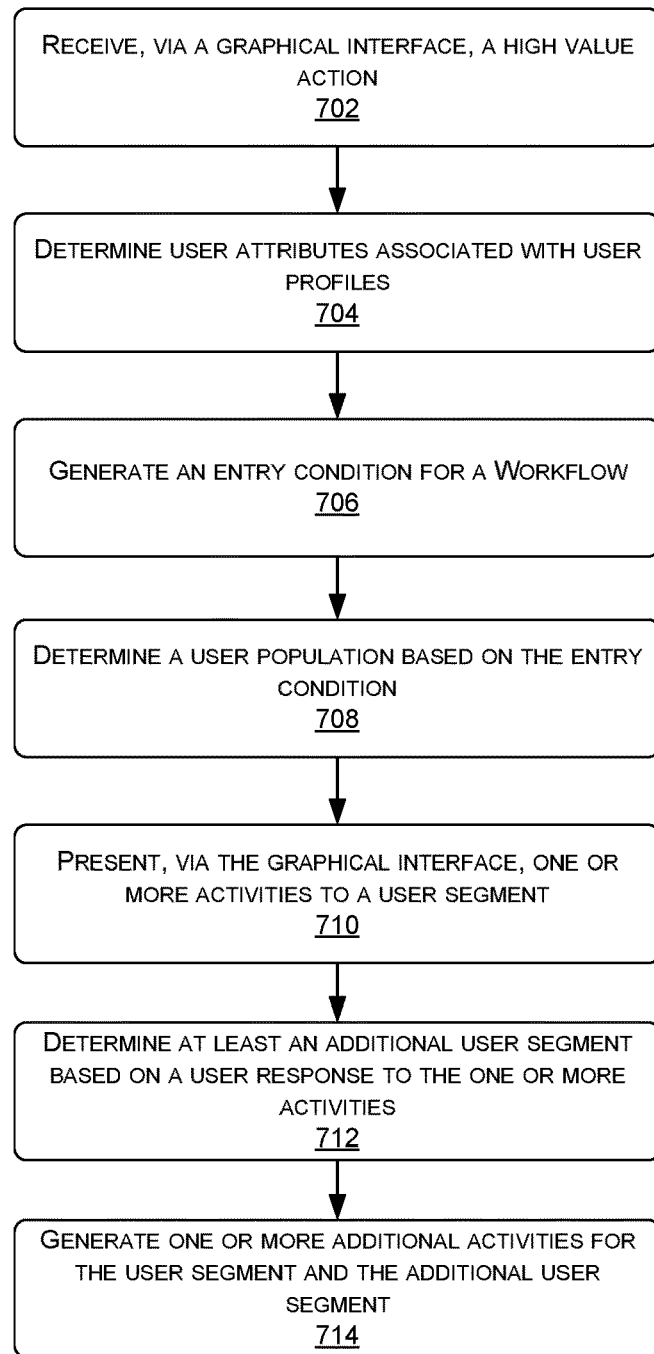
FIG. 7 illustrates an iterative method for generating activities comprising a workflow based on a high value action and user attributes associated with users.

FIG. 7 illustrates an iterative method for generating activities comprising a workflow based on a high value action (i.e., a desired action) and user attributes associated with users. In some embodiments of FIG. 7, the workflow manager can automatically operate to identify and recommend next steps in a user path to the entity. At block 702, the workflow manager can receive a high value action from the entity via a graphical interface. For example, the entity can indicate that the high value action is user participation in an online event such as a launch date for a program or a promotional event. Additionally, the high value action can be conversion events such as a user completing a purchase, renewing a subscription, or providing user information. Further, the high value action can be user interaction with a particular workflow or user path (e.g., the entity defines the high value action to be the user clicking or selecting a link in a message). Generally, the high value action is an objective that is defined by the entity and causes the workflow manager to construct a workflow that results in users completing the high value action.

In block 704, the workflow manager can identify one or more user attributes that are associated with one or more user profiles that represent individual users within a user population. As noted above with respect to FIG. 6, the user population can be provided to the workflow manager by the entity or can be determined by the workflow manager.

In block 706, the workflow manager can generate an entry condition for the workflow that is being constructed. In some embodiments, the entry condition can be defined by the entity or the workflow manager. For example, the entry condition for a workflow having the high value action "click on a link" can require that the user population for the workflow is associated with a preferred communication channel. Alternatively, one or more prior workflows associated with the high value action and one or more prior user responses can be stored by an internal database associated with the workflow manager. The one or more prior user responses can be associated with analytics that indicate one or more communications associated with user paths that resulted in successful completion of the high value action within the one or more prior workflows. Accordingly, the workflow manager can identify previous entry conditions associated with high completion rates for the high value actions and recommend the previous entry conditions as entry condition options. As a result, the entity can receive one or more entry condition options that are associated with the successful completion of the high value action in the past.

In block 708, and similar to block 614 of FIG. 6, the workflow manager can determine a user population based on the entry condition. In some embodiments, the workflow manager or the entity can configure the entry condition such that a random selection of the user population is assigned to a pilot user segment. The pilot user segment can be utilized as a test case for the workflow generated by the entity or the workflow manager. Generally, the pilot user segment is representative of the user population and is monitored to identify trends and user preferences regarding the workflow. For example, ten percent of a user population can be assigned to the pilot segment and be immediately presented with the workflow following activation of the workflow. Additionally, the remaining users of the user population can be delayed for a timeframe (e.g., 10 hours, 3 days, 7 days, etc.) that allows the workflow manager to monitor the pilot segment and determine correlations between pilot segment user attributes and pilot segment user responses.

In block 710, the workflow manager can present, to the entity a graphical interface displaying one or more activities that are presented to a user segment. In particular, the workflow manager can generate and configure a workflow comprised of one or more communications and one or more conditions. Additionally, the workflow manager can utilize communication templates provided by the entity to configure individual communications and transmit an entity configured method via multiple communication channels (e.g., email, SMS, push notification, etc.). For example, the pilot segment can be presented send message/transmit message communications including a send email communication, a send SMS communication, and a send push notification communication. Further, the workflow manager can monitor the pilot segment user responses to each of the presented communications. Accordingly, the workflow manager can identify user segments of the pilot segment that responded to the email communication, the SMS communication, and the push notification communication. The workflow manager can identify completion rates of the high value action (i.e., the desired action), provided by the entity, for each of the user segments of the pilot segment. In some embodiments, the workflow manager can identify a communication that received the most pilot segment user responses (e.g., 70% of the pilot segment responded to the push notification communication) and prioritize the communication for the remaining user population. Similarly, the workflow manager can identify the communication that received the highest completion rate for the high value action.

In some additional embodiments, the workflow manager can identify user attributes that are associated with individual users that responded to individual communications and/or performed the high value action. For example, pilot segment users that responded to the email message "The World Series is Here!" can have a positive correlation with users that view MLB® games via a desktop webpage (i.e., the user attribute). Accordingly, the workflow manager can identify correlations between the pilot segment user responses to individual communications and recommend a filter condition that prioritizes communications that have been associated with the user attribute.

In block 712, the workflow manager can determine an additional user segment based on the user responses to the one or more activities. As described above, the workflow manager can identify a prioritized communication based on the pilot user responses. The prioritized communication can be recommended to the entity and configured to receive the remaining users of the user population. Alternatively, the remaining users can be separated into additional user segments that are sequentially presented with the prioritized communications. As the additional user segments are presented with the prioritized communication, further analytics can be collected regarding user responses and the workflow manager can present an updated recommendation. For example, the workflow manager can recommend a workflow that presents the push notification communication to the remaining users, determines a first user segment that responded to the push notification and a second user segment that did not respond to the push notification. Additionally, the workflow manager can recommend the workflow present the email communication to the second user segment and the workflow present the SMS communication to the users that did not respond to the email.

Alternatively, the workflow manager can determine the additional user segment(s) based on the correlations determined based on the pilot segment responses. As noted above, the pilot segment responses can be analyzed to identify correlations between user attributes of the individual users and the pilot segment responses of the individual users. According, the workflow manager can recommend a condition filter that assigns the individual users to a plurality of additional user segments that are presented with the communications previously presented to the pilot segment based on user attribute/user response associations selected by the entity.

At block 714, the workflow manager can determine one or more additional activities to be presented to the pilot user segment and the additional user segments. In some embodiments, the process of presenting new activities to the pilot segment to identify prioritized communications and conditions for the remaining user population and additional user segments can be an iterative process to develop user paths. In particular, the user paths can be developed to target the high value action and attempt to cause the users to complete high value action or to cause an increase in the number of users that complete the high value action.

Figure 8:
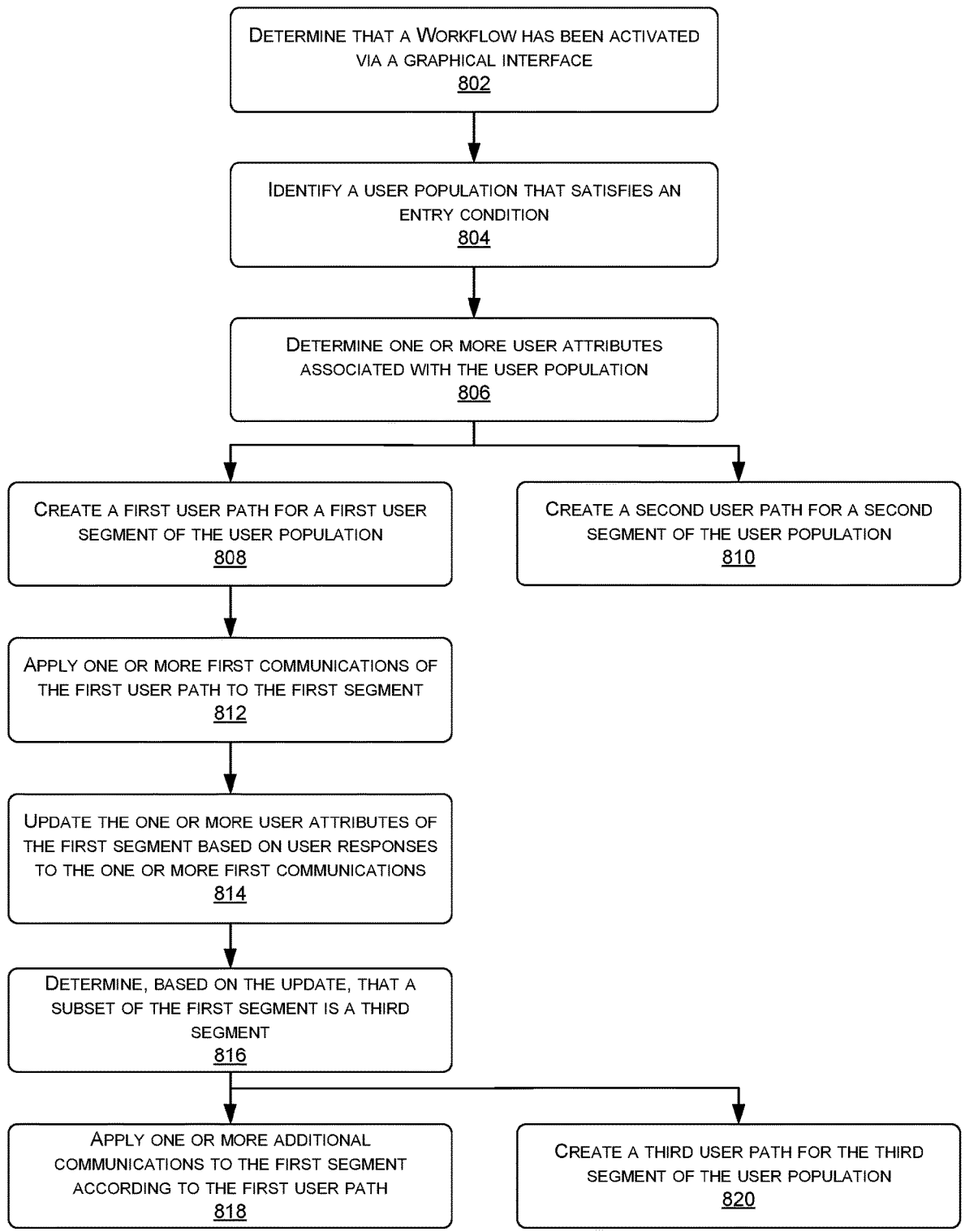
FIG. 8 illustrates a method for defining new user segments based on user attributes that are associated with user profiles or user attributes that are determined by a preceding activity that interacts directly with users or third parties.

FIG. 8 illustrates a method for defining new user segments based on user attributes that are associated with user profiles or user attributes that are determined by a preceding activity that interacts directly with users or third parties. At block 802, the workflow manager can determine that the entity has activated a workflow via the graphical interface. At block 804, and similar to blocks 614 and 708, the workflow manager can identify a user population that satisfies an entry condition associated with the workflow.

At block 806, the workflow manager can determine one or more user attributes associated with the user population. In some embodiments, the workflow manager can present an initial communication to the user population that satisfies the entry condition and identify the one or more user attributes based on the user responses. In some additional embodiments, one or more user profiles can be stored by an internal database and are associated with the one or more user attributes. The one or more user profiles can be provided by the entity during construction of the workflow or determined by the workflow manager during a prior workflow. In some additional embodiments, the workflow manager can transmit an information request to an external server for the one or more user attributes. The external server can be associated with the entity or a third party such as an SES or an ISP. Based on the one or more user attributes, the workflow manager can identify a first user segment and a second user segment from the user population. In some further embodiments, the workflow manager can identify the first user segment and the second user segment based on one or more indications received from the entry condition. In particular, an indication received from the entry condition can be received when the user population enters the workflow, when the users of the user population receive the initial communication, and when the entry condition receives user responses to the initial communication. Accordingly, the one or more indications can be reporting messages that are transmitted by a configured entry condition activity to the workflow manager in response user actions.

At block 808, the workflow manager can create a first user path for the first user segment of the user population. In some embodiments, the first user path is comprised of one or more first communications and first conditions selected and configured by the entity via the graphical interface. In some additional embodiments, the first user path can include one or more communications and one or more conditions recommended by the workflow manager based on prior user responses associated with the one or more user attributes for a prior user segment. Additionally, the entity can provide a database the includes a promotional offer bank, a message template bank, and other preconfigured communication templates and condition templates. For example, the workflow manager can select or recommend a preconfigured communication template that sends an email from the message template bank that are associated the prior user segment that was associated with the one or more user attributes. The promotional offer bank can include one or more promotional offers that are flagged as available, by the entity, for the workflow manager to present to users associated with the workflow. Similarly, the message template bank can include one or more message templates (e.g., email templates, push notification templates, SMS templates, etc.) that are provided by the entity and are associated with at least a user attribute by the entity or past workflows that transmitted the message template according to a prior communication.

At block 810, a similar process to block 808 can be used to generate a second, separate user path for the second user segment of the user population. The second user segment can be associated with one or more different user attributes and can be presented with communications and conditions configured based on the one or more different user attributes.

At block 812, one or more first communications created as a part of the first user path can be presented to the first segment. As noted above, the one or more first communications can be configured by the entity via the graphical interface or recommended by the workflow manager based on prior workflows, prior user responses (e.g., pilot segment responses), the promotion offer bank, and the message template bank. In some embodiments, applying the one or more first communications can cause the workflow manager to configure the message template or the promotion offer template based on the one or more user attributes associated with individual users of the first segment. For example, the one or more user attributes can include a user name, a user email address, and a favorite team of the user (e.g., Yankees®, Red Sox®, etc.). Additionally, an email template can be defined by the entity as: "Send to: USER@EMAIL.COM; Content: "Follow your TEAM NAME on the road to the World Series®," wherein the workflow manager can insert the user email address and the team name from the user attributes associated with the user profile of the individual users into the associated user attribute field in the message template. In some additional embodiments, the one or more first communications can transmit one or more indications to the workflow manager regarding the progress of the first segment. In particular, the one or more first communications can transmit an indication that the first segment has reached a first communication, that the first communication was applied to the first segment, that the one or more first users of the first segment received the first communication, and that the one or more first users responded (e.g., opened, interacted with, clicked on, ignored for a predetermined amount of time, etc.) to the first communication. Accordingly, the one or more indications can be reporting messages that are transmitted by a configured first communication activity to the workflow manager in response user actions and user progress.

At block 814, the workflow manager can receive user responses to the one or more first communications and update the one or more user attributes associated with the first segment. In some embodiments, the user responses to the one or more first communications can be stored by the internal database as one or more updated user attributes in the one or more user profiles of the first segment. Additionally, the one or more updated user attributes can replace the one or more user attributes where a user response indicates a change in the value for a user attribute.

At block 816, the workflow manager can determine, based on the update of the one or more user attributes, that a subset of the first segment is to be assigned to a third segment. In particular, the update to the one or more user attributes can include a new user attribute that indicates that the workflow manager should handle one or more third users of the third segment differently from the first segment as the workflow and the first user path progress. In at least one embodiment, the user response can update the one or more user attributes to associate individual users with the one or more different user attributes associated with the second segment. In at least one additional embodiment, the user response can update the one or more user attributes to differentiate between promotional offers and message templates flagged as presentable to the first segment and the third segment from the promotion offer template bank and the message template bank. For example, the user responses can indicate two classes of users within the first user segment. A first class that has an MLB® application account (i.e., the requirement for the first segment) and has logged into the MLB® application account on a desktop computer (i.e., the user response) can be flagged as able to receive desktop notifications from the message template bank and livestream promotions from the promotion offer template bank. A second class can have an MLB® application account and has logged into the MLB® application account on a mobile device, resulting in the second class being assigned to the third segment and flagged as able to receive SMS messages from the message template bank. In at least one further embodiment, the workflow manager can identify the subset of the first segment based on one or more indications received from a condition. In particular, the condition can be configured to identify the third users based on the association between the third users and the new user attribute specifically or based on the association between the third users and any new user attribute beyond the one or more user attributes. Additionally, the condition can be configured to transmit the one or more indications based on the first segment reaching the condition, a request of user attribute information by the condition, the condition waiting to evaluate the one or more first users (i.e., the condition is configured to hold the one or more first users for a period of time before evaluating the users), and the condition identifying one or more user subsets within the first segment. Accordingly, the one or more indications can be reporting messages that are transmitted by a configured condition activity to the workflow manager in response user actions and user progress.

At block 818, the workflow manager can present one or more additional communications to the first segment according to the first user path.

At block 820, the workflow can create a third user path for the third segment. In some embodiments, the process of block 820 can perform operations similar to those found in block 808. In some addition embodiments, where the third user segment is associated with the one or more different user attributes associated with the second user segment, the third user segment can be presented with the second user path.

Figure 9:
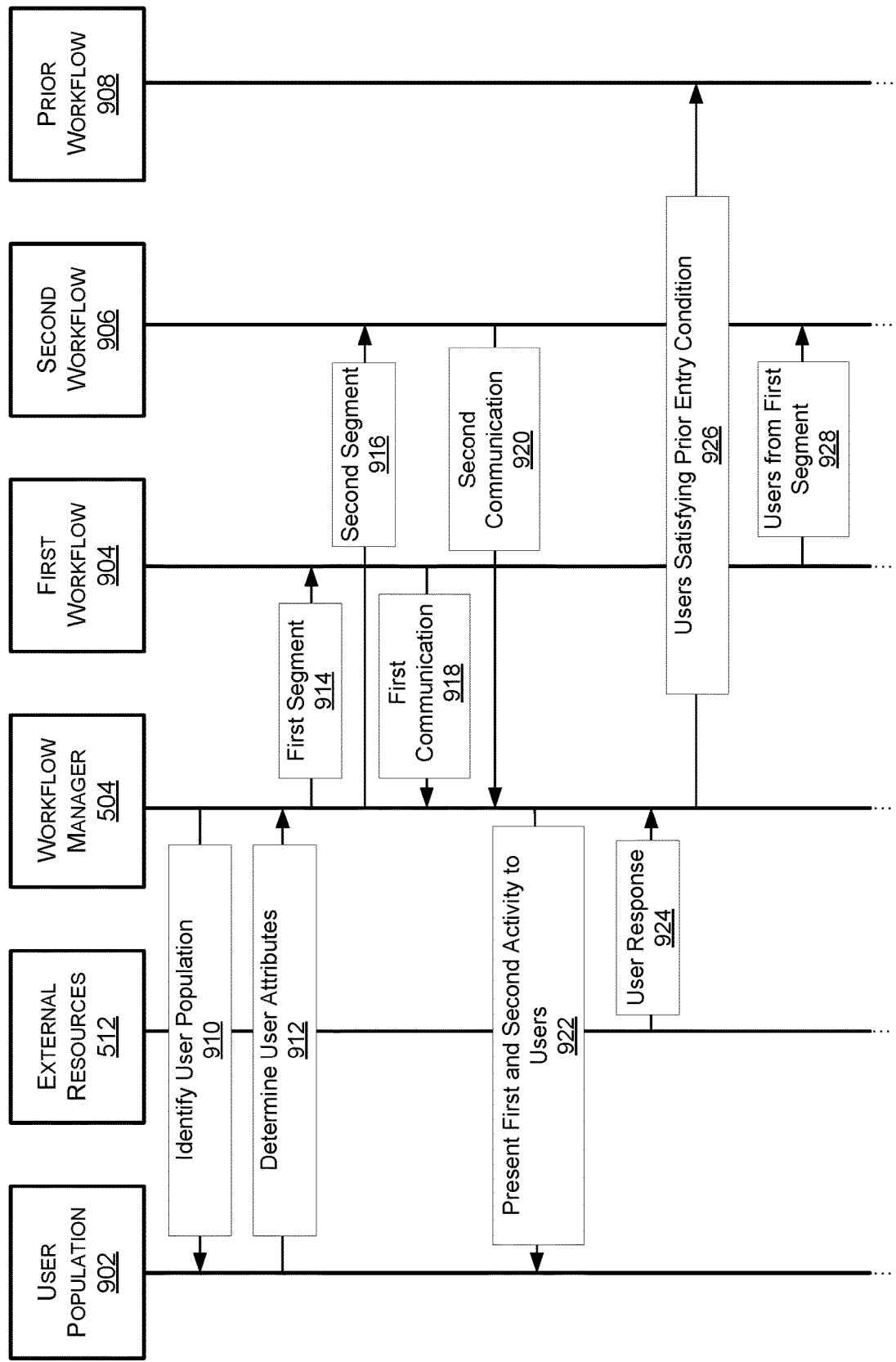
FIG. 9 illustrates a flow diagram of information that is obtained and distributed by a workflow manager for a duration of one or more active workflows.

FIG. 9 illustrates a flow diagram of information that is obtained and distributed by a workflow manager 504 for a duration of one or more active workflows. In particular, the user population can be associated with the workflow manager 504. The workflow manager 504 can assign individual users of the user population to participate in the first workflow 904 and the second work 906. In some embodiments, the individual users can be associated with a prior workflow 908. Alternatively, prior workflow 908 can be a currently inactive workflow that has been completed by a prior user segment.

At block 910, the workflow manager 504 can identify the user population 902 associated with the entity and create a user profile for each individual user of the user population 902. In particular, the user profile can include one or more attributes that are retrieved from the entity or external resources 512. The identification can occur via a network and can comprise indications received via a graphical interface.

At block 912, user attributes associated with the user population 902 can be retrieved by the workflow manager 504 or provided to the workflow manager 504 by the entity or the external resources 512. Additionally, the user attributes associated with the user population 902 can be stored in a plurality of user profiles associated with the user population and/or in a user attribute database.

At blocks 914 and 916, the workflow manager 504 can assign individual users of the user population 902 to a first segment 914 associated with the first workflow 904 and a second segment 916 associated with the second workflow 906. The assignment of individual users can occur according to similar processes recited by FIGS. 1-4 and 6-8. Additionally, the workflow manager 504 can cause the individual users to be assigned to the first segment 914 and the second segment 916 based on one or more indications received from a first entry condition associated with the first workflow 904 and a second entry condition associated with the second workflow 906. The one or more indications can include a current progress of the individual users and what actions have been taken by the first workflow 904 and/or the second workflow 906 relating to the individual users. Further, the first entry condition and the second entry condition can transmit the one or more indications, for each of the individual users of the user population 902 to a data processing service that is configured to handle a high volume of user data. The data processing service can enable the workflow manager 504 to receive the one or more indications and utilize the one or more indications to update the plurality of user profiles and/or the user attribute database. Alternatively, the data processing service can enable the workflow manager 504 to update the graphical interface presented to the entity via the entity device to reflect the progress of the individual users within the first workflow 904 and the second workflow 906.

Similarly, at block 918 and 920, at least a first communication 918 and a second communication 920 are provided to the workflow manager 504 by the first workflow 904 and the second workflow 906, respectively. The first communication 918 and the second communication 920 can be configured according to the preceding figures and can be configured by the entity via the graphical interface or the workflow manager 504 according to a message template from a message template bank or a promotional offer template from a promotional offer bank. In at least one embodiment, the workflow manager 504 can receive one or more indications associated with the first communication 918 and/or the second communication 920. As noted above, the one or more indications can indicate the progress of one or more first users associated with the first segment 914 and one or more second users associated with the second segment 916. As noted above, the one or more indications can be utilized to update the plurality of user profiles, the user attribute database, and the graphical interface presented to the entity.

At block 922, the workflow manager 504 can present the first and second communication 920 to the one or more first users associated with the first segment 914 and the one or more second users associated with the second segment 916. In some embodiments, the workflow manager 504 includes a transmission module that is configured to generate the communication that is transmitted from the workflow manager 504 to the individual users of the user population 902. In some additional embodiments, the workflow manager 504 can transmit the first communication 918 and the second communication 920 to the external resources 512 (e.g., a SES, an ISP, etc.). The external resources 512 can subsequently distribute the first and the second communication 920 to the user population 902. In some further, embodiments, the first communication 918 is presented to only the users associated with the first workflow and the second communication 920 is presented to only the users associated with the second workflow. In at least one embodiment, the first communication 918 and the second communication 920 include an indication that causes the external resources 512 to track and collect user responses for the workflow manager 504. In some further embodiments, the first communication 918 and the second communication 920 are configured to transmit a message and/or a communication to the individual users of the user population 902. In particular, the first communication 918 and the second communication 920 are configured to transmit the message via the transmission module associated with the workflow manger 504.

At block 924, the workflow manager 504 receives the user responses. In some embodiments, the user responses are received directly from the user population 902. In some additional embodiments, the user responses are received from the external resources 512. Additionally, the external resources 512 can provide the user response based on the indication associated with the first communication 918 and the second communication 920. For example, the external resources 512 can distinguish between the user opening an email, ignoring the email, clicking on a body of the email, and blocking the email. In at least one embodiment, without the user responses reported by the external resource 512, the workflow manager 504 may be unable to distinguish between actions taken by the user population in response to the first communication 918 and the second communication 920. Alternatively, the first communication 918 and/or the second communication can receive the user response from the external resources 512 and provide the user response to the workflow manager 504 with the one or more indications transmitted to the workflow manager 504.

At block 926, the workflow manager 504 can identify, based on the user responses, one or more users that satisfy the prior entry condition associated with the prior workflow 908. In particular, the workflow manager 504 can have authority to activate the inactive prior workflow and present the one or more users with one or more prior communications according to the prior user paths. Accordingly, the workflow manager 504 can continue utilize old workflows that would otherwise remain inactive to generate additional value for the entity without the input of additional development resources to identify the new user segment for the prior workflow.

At block 928, the workflow manager 504 can identify users associated with the first segment 914 that are to be assigned to the second segment 916 and the second workflow 908 based on the user responses. In particular, the user responses can indicate changes in the user attributes associated with the user population 902. The workflow manager 504 can operate to identify the changes in user attributes, identify the associated users, and reassign the associated users to the second workflow 906. In some embodiments, the assignment of the associated users to the second workflow 906 allows the workflow manager 504 to present communications from both the first workflow 904 and the second workflow 906 to the associated users. Alternatively, the first workflow 904 and the second workflow 906 can be mutually exclusive and cause the workflow manager 504 to remove the associated users from the first workflow 904 and assign them to the second workflow 906 based on the user response.

Figure 10:
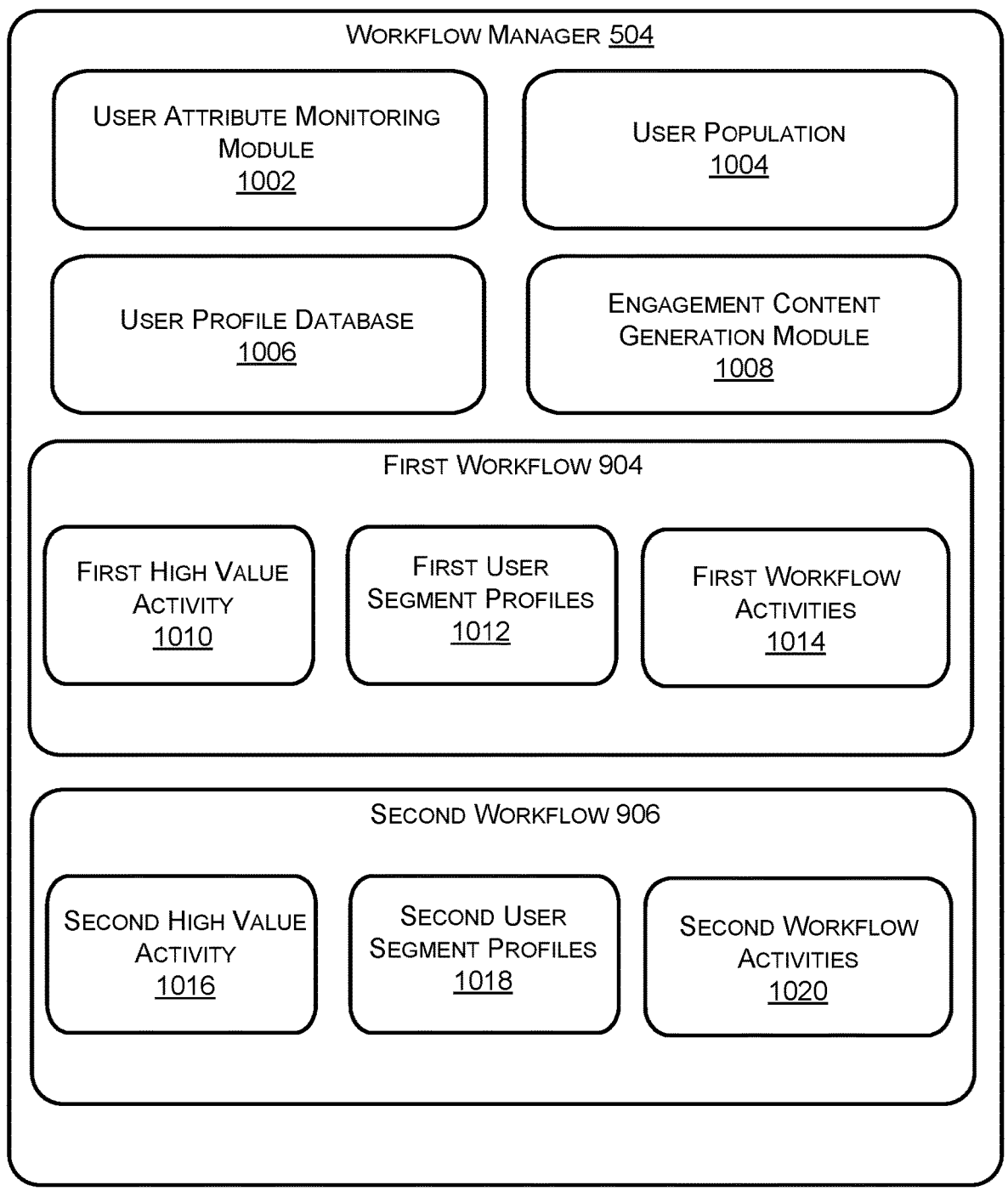
FIG. 10 illustrates a diagram of a workflow manager and one or more workflows that identifies where user information is housed within a workflow manager and individual workflows.

FIG. 10 illustrates a diagram of a workflow manager and one or more workflows that identifies where user information is housed within a workflow manager and individual workflows. Workflow manager 504 can be comprised of multiple levels of information. The workflow manager 504 can directly access information from a user attribute monitoring module 1002, a user population 1004, a user profile database 1006, and an engagement content generation module 1008. Additionally, a first workflow 904 can directly access information regarding a first high value activity 1010, first segment user profiles 1012, and first workflow activities. Further, a second workflow 906 can directly access information regarding a second high value activity 1016, second segment user profiles 1018, and second workflow activities 1020.

In some embodiments, the workflow manager 504 is responsible for monitoring the user population 1004 and updating the user profile database 1006 based on any changes in user attributes associated with the user population 1004. In particular, the user population 1004 can increase or decrease in size as the entity associates with and disassociates from users. Alternatively, the entity can define the user population 1004 for according to internal entity servers that identify the users comprising the user population 1004.

In some embodiments, the users of the user population 1004 are dynamic entities. Accordingly, the user attribute monitoring module 1002 can be configured to monitor the communications that are presented to the user population by the first workflow 904 and the second workflow 906 and identify updated user attributes based on user responses. As a result, the workflow manager 504 can update the user profile database 1006 to reflect the updated user attributes identified by the user attribute monitoring module 1002

In some embodiments, the first workflow 904 transmits the one or more first workflow activities 1014 to the workflow manager 504. The workflow manager receives the one or more first workflow activities 1014 and configures each first workflow activity 1014 according to the user attributes stored by user profile database according to the engagement content generation module 1008. In some additional embodiments, the first workflow 904 provides the first workflow activities 1014 and the information stored by the first segment user profiles 1020 to the engagement content generation module 1008 and causes the workflow manger to present the configured first workflow activities 1014. In some further embodiments, and as discussed by FIG. 7, the entity can define the first high value activity 1010 for the workflow manage and construct the first workflow 904 to increase user participation or completion of the first high value activity 1010.

In some embodiments, the workflow manager 504 monitors the first segment user profiles 1012 and the second segment user profiles 1018 via the user attribute monitoring module 1002. In some additional embodiments, the first workflow 904 and the second workflow 906 are configured by the entity and operate under the workflow manager 504 independent of the other. Accordingly, changes to segment user profiles 1012 and 1018 are distributed by the workflow manager 504 to the first workflow 904 and the second workflow 906 as the user profile database 1006 is updates with user responses to the content presented via the engagement content generation module 1008.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    receiving, from an entity device associated with an entity and via a graphical interface, a user population associated with a future event;
    presenting, to the entity device via the graphical interface, an active workflow comprised of an entry condition that determines whether a user has received a message associated with the future event and one or more communications;
    identifying, based on the entry condition, a plurality of users from the user population that have received the message; and
    causing, based on the active workflow, a workflow manager to:
        determine, for the plurality of users, a plurality of user responses to the message;
        determine, based on the plurality of user responses, a first user segment comprised of one or more first users that interacted with the message and a second user segment comprised of one or more second users that did not interact with the message;
    send, to one or more devices associated with the first user segment, the one or more communications configured to gather one or more user attributes;
    determine, based on the one or more user attributes, a workflow progress associated with each of the one or more first users, wherein the workflow progress indicates a subset of the one or more communications have been received by the one or more first users and the one or more user attributes gathered from the one or more first users; and
    generate, based on the workflow progress associated with each of the one or more first users, one or more analytics that report the workflow progress for the one or more first users and the one or more user attributes associated with the one or more first users; and
  presenting, via the graphical interface, the one or more analytics to the entity device.

2. The method as recited by claim 1, further comprising:
  receiving, from the entity device and via the graphical interface, a selection of the first user segment or the active workflow; and
  displaying, via the graphical interface and based on the selection, the one or more analytics and a number of users that have received each of the one or more communications.

3. The method as recited by claim 1, wherein the one or more user attributes gathered from the one or more first users include at least one of:
  a user communication preference configured to indicate the one or more first users receive at least one of text message communications, email communications, or push notification communications; or
  one or more additional user responses, received from the one or more first users, associated with the one or more communications.

4. The method as recited by claim 1, wherein the workflow manager is further configured to:
  send, to second devices associated with the second user segment, one or more second communications configured to gather one or more second user attributes;
  determine, based on the one or more second user attributes, a second workflow progress associated with each of the one or more second users, wherein the second workflow progress indicates a second subset of the one or more second communications have been received by the one or more second users and the one or more second user attributes gathered from the one or more second users; and
  generate, based on the workflow progress associated with each of the one or more second users, one or more second analytics that report the second workflow progress for the one or more second users and the one or more second user attributes associated with the one or more second users.

5. The method as recited by claim 4, further comprising:
  presenting, via the graphical interface, the one or more second analytics to the entity device;
  receiving, from the entity device and via the graphical interface, a selection of at least one of the first user segment, the second user segment, or the active workflow; and
  displaying, via the graphical interface and based on the selection, at least one of the one or more analytics or the one or more second analytics, wherein the graphical interface is configured to:
    display, based on the selection including the first user segment, a first number of the one or more first users that have received each of the one or more communications and the one or more second communications;
    display, based on the selection including the second user segment, a second number of the one or more second users that have received each of the one or more communications and the one or more second communications; or
    display, based on the selection including the active workflow, a total number of the plurality of users that have received each of the one or more communications and the one or more second communications.

6. A system comprising:
  one or more processors; and
  a memory storing one or more computer-executable instructions that are executable by the one or more processors to perform operations comprising:
    receiving, from an entity device via a graphical interface, a user population associated with one or more active workflows;
    identifying, from the user population, a user segment comprised of one or more users that satisfy an entry condition associated with an active workflow of the one or more active workflows, the active workflow comprised of one or more communications and one or more filter conditions;
    transmitting, based at least in part on the active workflow, the one or more communications to devices associated with the one or more users;
    receiving, based at least in part on the one or more communications, one or more user actions associated with the one or more users;
    monitoring, during transmission of the one or more communications to the one or more users, the active workflow to determine a user subsegment from the user segment, the user subsegment associated with a user path of the active workflow; and
    presenting, to the entity device via the graphical interface, the user path and the user subsegment.

7. The system as recited by claim 6, wherein identifying the one or more users that satisfy the entry condition further comprises:
  receiving, from a user attribute database, one or more user attributes stored by a user profile associated with a user of the user population;
  determining, based at least in part on the entry condition, a user attribute value that is associated with the active workflow; and
  determining, based at least in part on the user profile, whether the user is associated with the user attribute value.

8. The system as recited by claim 6, wherein receiving the one or more user actions further comprises:
  determining, based at least in part on the one or more user actions, at least one of an updated user attribute value or a new user attribute associated with a user;
  updating, based at least in part on the one or more user actions, a user profile associated with the user by replacing an outdated user attribute with the new user attribute or by adding the new user attribute to the user profile; and causing, based at least in part on the one or more user actions, the user to receive one or more additional communications.

9. The system as recited by claim 6, wherein monitoring the active workflow further comprises:
   determining, based at least in part on the one or more user actions, that the user subsegment has received and responded to a first communication of the one or more communications;
   determining, based at least in part on the one or more user actions, a second user subsegment that has received the first communication; and
   transmitting, to the user subsegment, a second communication from the user path associated with the user subsegment.

10. The system as recited by claim 9, wherein monitoring the active workflow further comprises:
    identifying, based at least in part on the user subsegment, one or more first user profiles;
    identifying, based at least in part on the second user subsegment, one or more second user profiles;
    updating the one or more first user profiles to reflect that the user subsegment has responded to the first communication and received the second communication; and
    updating the graphical interface presented to the entity device to associate the user subsegment with the second communication.

11. The system as recited by claim 6, wherein monitoring the active workflow further comprises receiving one or more indications from the active workflow, the one or more indications comprising:
    a first indication that the entry condition was sent to the user population;
    a second indication that the one or more users of the user segment entered the active workflow;
    a third indication that the one or more communications were sent to the devices associated with the one or more users; and
    a fourth indication that the one or more users have responded to the one or more communications, the one or more user actions including at least one of a message opened event or a message received event.

12. The system as recited by claim 11, wherein the one or more indications are received for each individual user of the one or more users and are utilized to update the graphical interface and associate the user subsegment with the one or more communications of individual user paths.

13. A method comprising:
    displaying, via a graphical interface, a workflow comprised of one or more user paths, the one or more user paths including one or more communications and one or more filter conditions;
    monitoring, during execution of the workflow, the one or more user paths of the workflow;
    identifying one or more users that satisfy an entry condition associated with a user path of the one or more user paths, the entry condition configured to determine whether a user attribute is associated with the one or more users;
    transmitting, to devices associated with the one or more users, a communication of the one or more communications;
    determining, for the one or more users, one or more user responses associated with the communication; and
    updating, based at least in part on the one or more user responses, the graphical interface to display the workflow and the one or more users associated with the user path.

14. The method as recited by claim 13, wherein displaying the workflow via the graphical interface further comprises:
    displaying, for each of the one or more user paths, the one or more communications and the one or more filter conditions in an ordered sequence configured based at least in part on the user path; and
    displaying, for each of the one or more communications, the one or more users that have received a communication message associated with each of the one or more communications; and
    displaying, for each of the one or more filter conditions, at least one or more first users that have been assigned to a first user segment and one or more second users that have been assigned to a second user segment.

15. The method as recited by claim 14, wherein displaying the workflow via the graphical interface further comprises:
    updating the graphical interface to display one or more new users that have received the communication message; and
    updating the graphical interface to display one or more new first users, of the one or more new users, that have been assigned to the first user segment and one or more new second users, of the one or more new users, that have been assigned to the second user segment.

16. The method as recited by claim 13, wherein displaying the workflow via the graphical interface further comprises:
    generating one or more workflow analytics that identify a user population associated with the workflow, the one or more users associated with each of the one or more user paths, and one or more user segments associated with the workflow; and
    displaying, via the graphical interface, an information panel comprised of the one or more workflow analytics.

17. The method as recited by claim 13, wherein displaying the workflow via the graphical interface further comprises:
    generating one or more activity analytics for the communication, the one or more activity analytics identifying the one or more users that received the communication and the one or more user responses received from the one or more users; and
    displaying, via the graphical interface, an information panel comprised of the one or more activity analytics.

18. The method as recited by claim 13, wherein monitoring the one or more user paths of the workflow further comprises:
    generating, for each of the one or more communications, an event report that identifies that a user of the one or more users has received a communication message or has responded to the communication message; and
    updating a user profile associated with the user to include the event report.

19. The method as recited by claim 13, wherein:
    the one or more users associated with the user path are further associated with an additional user path, the additional user path comprised of one or more additional communications;
    the one or more user responses include one or more updated user attributes;
    the one or more updated user attributes cause the one or more users to receive the one or more additional communications; and the graphical interface is updated to display the one or more users in association with the additional user path and the one or more additional communications.

20. The method as recited by claim 13, wherein:

one or more additional users are associated with an additional user path, the additional user path comprised of one or more additional communications;

the one or more additional users transmit an additional user response associated with the one or more additional communications;

the additional user response causes the one or more additional users to be identified as satisfying the entry condition for the user path; and the graphical interface is updated to display the one or more additional users in association with the user path.

* * * * *